(12) United States Patent
Kato et al.

(10) Patent No.: US 8,049,624 B2
(45) Date of Patent: Nov. 1, 2011

(54) WIRELESS COMMUNICATION METHOD

(75) Inventors: Kiyoshi Kato, Atsugi (JP); Yutaka Shionoiri, Isehara (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 548 days.

(21) Appl. No.: 12/076,986

(22) Filed: Mar. 26, 2008

(65) Prior Publication Data
US 2008/0258918 A1 Oct. 23, 2008

(30) Foreign Application Priority Data

Apr. 18, 2007 (JP) .................................. 2007-109533

(51) Int. Cl.
*G08B 13/14* (2006.01)
(52) U.S. Cl. ..................... 340/572.4; 340/572.1; 342/44; 342/51
(58) Field of Classification Search ............... 340/572.1, 340/572.4, 539.21, 539.15, 539.1, 825.54; 342/44, 51, 453
See application file for complete search history.

(56) References Cited

U.S. PATENT DOCUMENTS

| | | | | |
|---|---|---|---|---|
| 5,051,741 | A | * | 9/1991 | Wesby ....................... 340/825.49 |
| 6,630,910 | B2 | * | 10/2003 | Forster et al. ................. 343/806 |
| 7,629,886 | B2 | * | 12/2009 | Steeves ....................... 340/572.1 |
| 7,786,866 | B2 | * | 8/2010 | Berthold .................... 340/572.1 |
| 7,907,055 | B2 | | 3/2011 | Hardy et al. |
| 2005/0134435 | A1 | | 6/2005 | Koyama et al. |
| 2007/0229271 | A1 | * | 10/2007 | Shionoiri et al. ........... 340/572.1 |
| 2009/0058652 | A1 | * | 3/2009 | Hardy et al. ............... 340/572.1 |

FOREIGN PATENT DOCUMENTS

| | | |
|---|---|---|
| JP | 2001-024547 | 1/2001 |
| WO | WO-2006/106504 | 10/2006 |

OTHER PUBLICATIONS

Chinese Office Action (Application No. 200810090718.9) Dated Jul. 19, 2011.

* cited by examiner

*Primary Examiner* — Jennifer Mehmood
*Assistant Examiner* — Hongmin Fan
(74) *Attorney, Agent, or Firm* — Eric J. Robinson; Robinson Intellectual Property Law Office, P.C.

(57) ABSTRACT

To provide a wireless communication method in the case where communication of a wireless signal from a communication device to a semiconductor device can be ensured, communication of a wireless signal can be ensured without using a repeater even when communication of a wireless signal from a semiconductor device to a communication device is difficult due to an external factor such as an obstacle. A plurality of semiconductor devices operate in selectively switching between a first state in which the first wireless signal transmitted from the communication device is received and a second state in which the second wireless signal transmitted from the semiconductor device is received. The semiconductor device in the second state receives the second wireless signal from the semiconductor device in the first state and transmits to the communication device the second wireless signal including detection data for indicating that the second wireless signal is received.

18 Claims, 22 Drawing Sheets

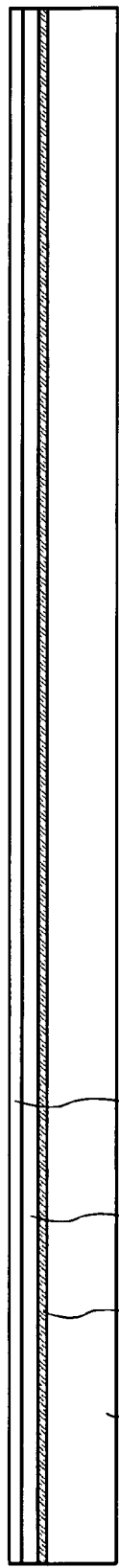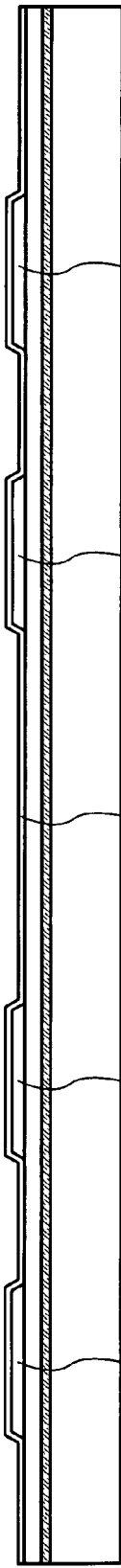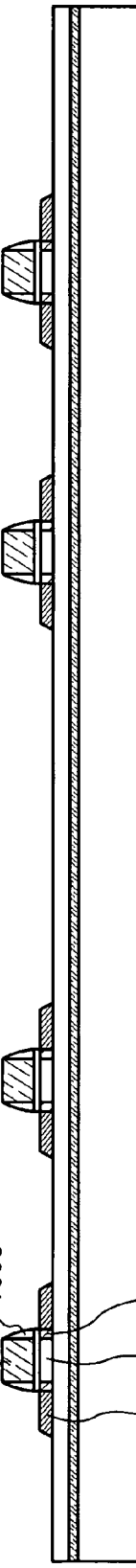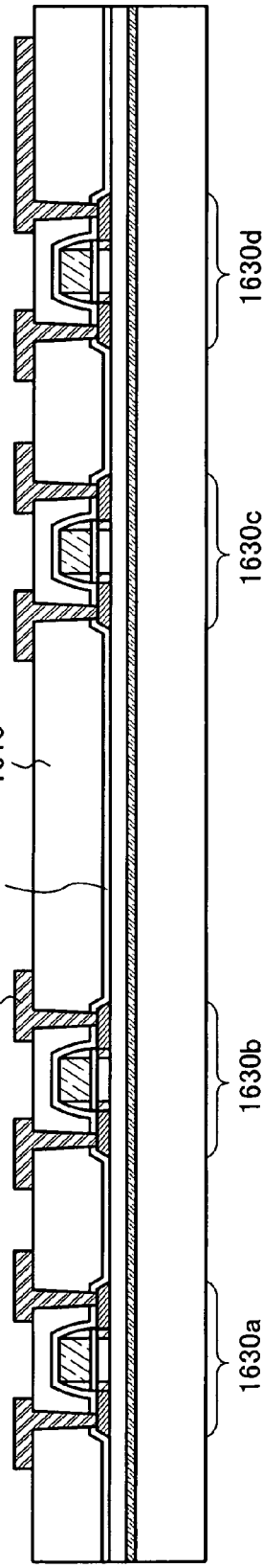

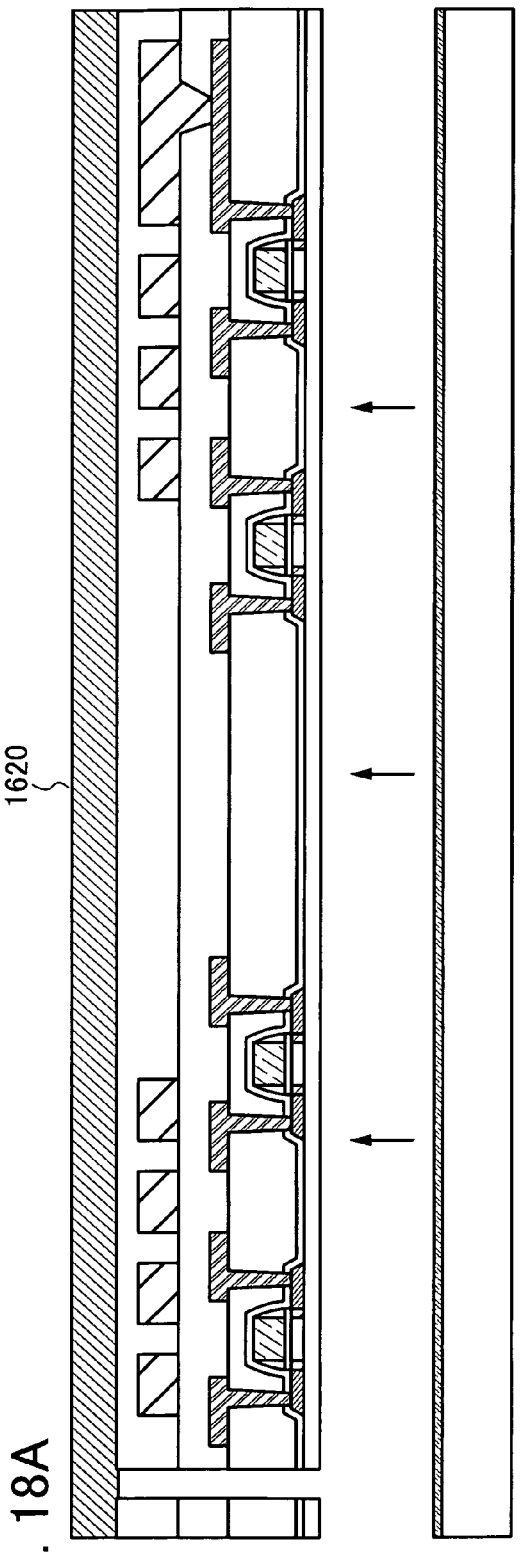
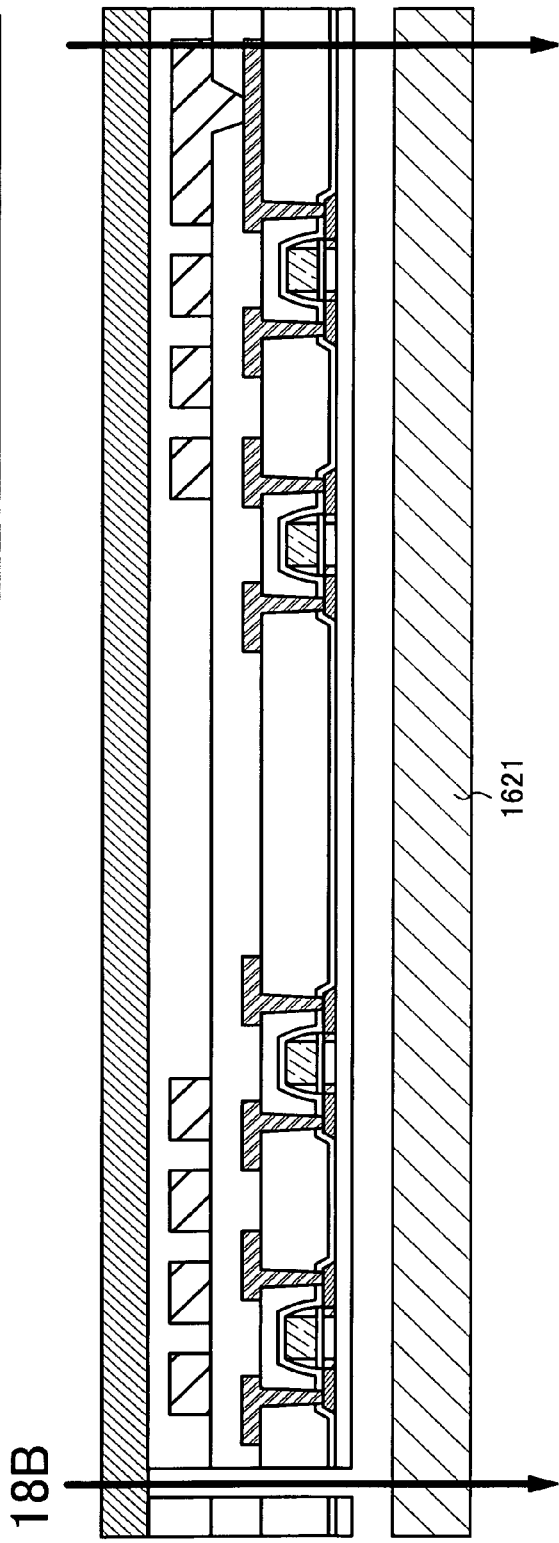
FIG. 18A
FIG. 18B

WIRELESS COMMUNICATION METHOD

BACKGROUND OF THE INVENTION

1. Field of the Invention

The present invention relates to a wireless communication method. The present invention particularly relates to a method for wireless communication between a semiconductor device which transmits and receives a signal, that is, RFID (radio frequency identification) tag and an external communication device.

Note that a semiconductor device here refers to a general device which can function using semiconductor characteristics.

2. Description of the Related Art

Owing to development of computer technologies and improvement of image recognition technologies, data identification methods utilizing media such as barcodes have spread widely and have been used for identification of product data and the like. It is expected that the amount of data to be identified will further increase in the future. On the other hand, data identification utilizing barcodes is disadvantageous in that a barcode reader is required to be in contact with the barcodes, and that the amount of data capable of being stored in the barcodes is not so large. Therefore, contactless data identification and increase in the storage capacity of a medium have been required.

In view of the foregoing requirements, an RFID tag (hereinafter referred to as a semiconductor device, and also referred to as an ID chip, an IC tag, an ID tag, an RF tag, a wireless tag, an electronic tag, or a transponder) utilizing semiconductor characteristics and a wireless communication device (hereinafter referred to as a communication device, and also referred to as a reader/writer, a controller, or an interrogator) having a function of communicating with a semiconductor device have been developed. A semiconductor device stores necessary data in a storage element of the semiconductor device and reads the data by the communication device with the use of a contactless means, generally a wireless signal. It is expected that practical application of such a wireless communication system for reading data stored in a semiconductor device will allow commercial distribution and the like to be simplified and reduced in cost while ensuring high security.

In recent years, a system with which data can be transmitted and received without contact in a variety of fields where automatic identification is necessary, such as payment for goods, has spread widely. A product on which such a semiconductor device is mounted is designed so as to read and write data from/to an external device without contact through an antenna having a shape suited to a frequency band used at the time of transmission or reception of data.

A semiconductor device which performs wireless communication can read a signal from a plurality of semiconductor devices by providing an anti-collision function (also referred to as anti-collision simply) in a communication device, unlike reading of two-dimensional data such as barcodes. Further, a semiconductor device which performs wireless communication can transmit and receive a wireless signal even if there is an obstacle between a communication device and the semiconductor device, unlike reading of two-dimensional data such as barcodes. In the case where there is an obstacle between a communication device and the semiconductor device and accordingly a wireless signal cannot be transmitted and received, a repeater for transmitting and receiving the wireless signal is provided to secure identification information of a desired semiconductor device (see Patent Document 1: Japanese Published Patent Application No. 2001-24547).

SUMMARY OF THE INVENTION

When there is an obstacle between a semiconductor device and a communication device, a wireless signal (also referred to as a first wireless signal) transmitted to the semiconductor device from the communication device can be received by the semiconductor device because the communication device is connected to an external power source and the intensity of the wireless signal can be increased. However, if there is an obstacle between a semiconductor device and a communication device, it is difficult to increase the intensity of the wireless signal because the semiconductor device is not connected to an external power source. Therefore, there has been a problem in that a wireless signal (also referred to as a second wireless signal) transmitted to the communication device from the semiconductor device cannot be received by the communication device.

In the case of a method in which the repeater described in Patent Document 1 is used to ensure communication of the first wireless signal and the second wireless signal between the communication device and the semiconductor device, the repeater is placed upon determining whether there is an obstacle between the communication device and the semiconductor device in advance. Therefore, it is necessary to place anew the repeater in accordance with a change in location of the obstacle. However, it is a concern that placing anew the repeater leads to increase in cost.

Thus, an object of the present invention is to provide a wireless communication method by which in the case where communication of a wireless signal from a communication device to a semiconductor device can be ensured, communication of a wireless signal can be ensured without using a repeater even when communication of a wireless signal from a semiconductor device to a communication device is difficult due to an external factor such as an obstacle.

In view of the foregoing problems, according to one aspect of the present invention, in a wireless communication method where a first wireless signal transmitted from a communication device is received by a plurality of semiconductor devices and thus a second wireless signal is transmitted to the communication device from the plurality of semiconductor devices, the plurality of semiconductor devices operate in selectively switching between a first state in which the first wireless signal transmitted from the communication device is received and a second state in which the second wireless signal transmitted from the semiconductor device is received, in response to the first wireless signal transmitted from the communication device. The semiconductor device in the second state receives the second wireless signal from the semiconductor device in the first state and transmits to the communication device the second wireless signal including detection data for indicating that the second wireless signal is received.

According to another aspect of the present invention, in a wireless communication method where a first wireless signal transmitted from a communication device is received by a plurality of semiconductor devices and thus a second wireless signal is transmitted to the communication device from the plurality of semiconductor devices, the plurality of semiconductor devices operate in selectively switching between a first state in which the first wireless signal transmitted from the communication device is received and a second state in which the second wireless signal transmitted from the semiconductor device is received, in response to the first wireless signal transmitted from the communication device. The semiconductor device in the second state receives the second wireless signal from the semiconductor device in the first state and stores data of the second wireless signal in a storage element included in the semiconductor device in the second state. The semiconductor device which stores the data from the semiconductor device in the first state receives the first wireless signal from the communication device and thereby transmits the data as the second wireless signal to the communication device.

With the structure of the present invention, when communication of a wireless signal from a semiconductor device to a communication device is difficult due to an external factor such as an obstacle, communication of a wireless signal from a semiconductor device to a communication device can be ensured by way of another semiconductor device. Therefore, a wireless communication method, by which in the case where communication of a wireless signal from a communication device to a semiconductor device can be ensured, communication of a wireless signal can be ensured without using a repeater even when communication of a wireless signal from a semiconductor device to a communication device is difficult due to an external factor such as an obstacle, can be provided.

BRIEF DESCRIPTION OF THE DRAWINGS

In the accompanying drawings:

FIGS. 13A to 13D are views showing a method for manufacturing a semiconductor device of Embodiment Mode 4.

FIGS. 18A and 18B are are views showing a method for manufacturing a semiconductor device of Embodiment Mode 4.

DETAILED DESCRIPTION OF THE INVENTION

Figure 1:
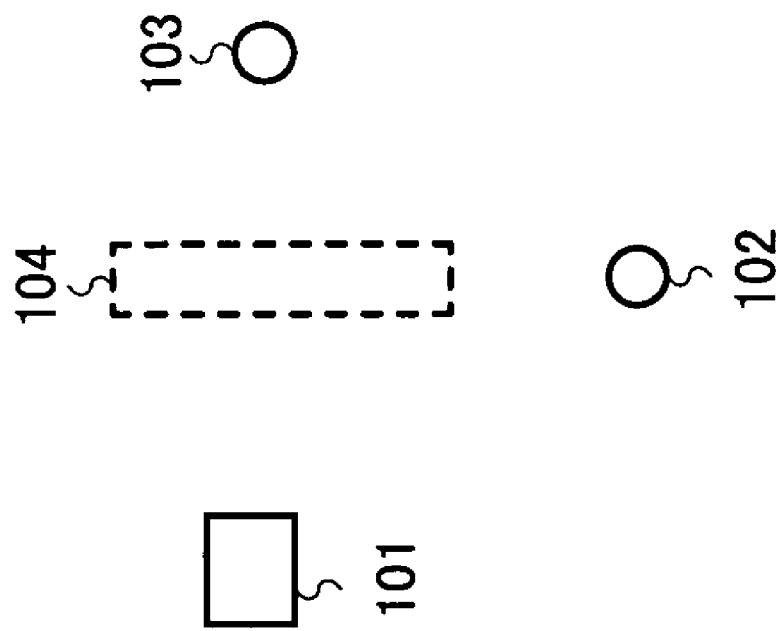
FIG. 1 is a diagram illustrating a wireless communication method of Embodiment Mode 1.

Hereinafter, embodiment modes of the present invention will be described with reference to the accompanying drawings. However, the present invention can be carried out in many different modes, and it will be easily understood by those skilled in the art that various changes and modifications can be made to the modes and their details without departing from the spirit and scope of the present invention. Therefore, the present invention should not be construed as being limited to the description in the following embodiment modes. Note that like reference numerals refer to like parts throughout the drawings for illustrating the embodiment modes, and description thereof is omitted.

Embodiment Mode 1

In this embodiment mode, a system structure, a device structure, a flowchart, and the like for achieving a wireless communication method will be described.

FIG. 1 shows the system structure for illustrating a wireless communication method in this embodiment mode.

FIG. 1 illustrates the simplest model of the structure of a wireless communication method of this embodiment mode in the case where communication of a wireless signal from a semiconductor device to a communication device is difficult due to an external factor such as an obstacle. FIG. 1 is a two-dimensional schematic diagram showing the location of a communication device 101, a semiconductor device 102, a semiconductor device 103, and an obstacle 104.

FIG. 1 shows the location of the communication device 101, the semiconductor device 102, the semiconductor device 103, and the obstacle 104 in two dimensions; however, they are actually placed in three dimensions. Further, although FIG. 1 illustrates a plurality of semiconductor devices of this embodiment mode by taking the semiconductor device 102 and the semiconductor device 103 as an example, wireless communication may be actually performed by way of many more semiconductor devices. Further, if wireless signals interfere each other between the plurality of semiconductor devices, the communication device may control each semiconductor device whether or not to reply so that wireless communication is performed.

Note that transmission and reception in this specification are performed by a communication device or a semiconductor device, which is a subject, as appropriate. Therefore, a first wireless signal is transmitted by the communication device 101 and received by the semiconductor devices 102 and 103. A second wireless signal is transmitted by the semiconductor devices 102 and 103 and received by the communication device 101. Transmission and reception of the first wireless signal or the second wireless signal between the communication device 101, and the semiconductor devices 102 and 103 are collectively referred to as transmission and reception of the first wireless signal or the second wireless signal.

Next, the wireless communication method of this embodiment mode will be described with reference to FIGS. 2A to 4C each of which is a schematic diagram illustrating transmission and reception of the first wireless signal and the second wireless signal and FIGS. 5 and 6 each of which is a flowchart. Note that in the flowcharts of FIGS. 5 and 6, the communication device 101, the semiconductor device 102, and the semiconductor device 103 are abbreviated to "R/W", "A", and "B", respectively.

Figure 2B:
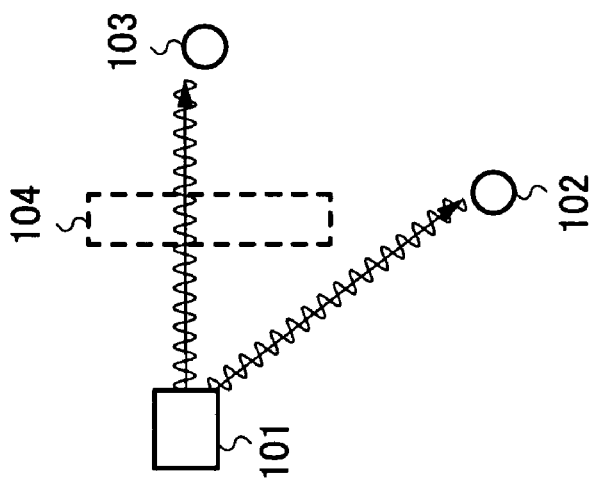
FIGS. 2A and 2B are diagrams each illustrating a wireless communication method of Embodiment Mode 1.
Figure 2A:
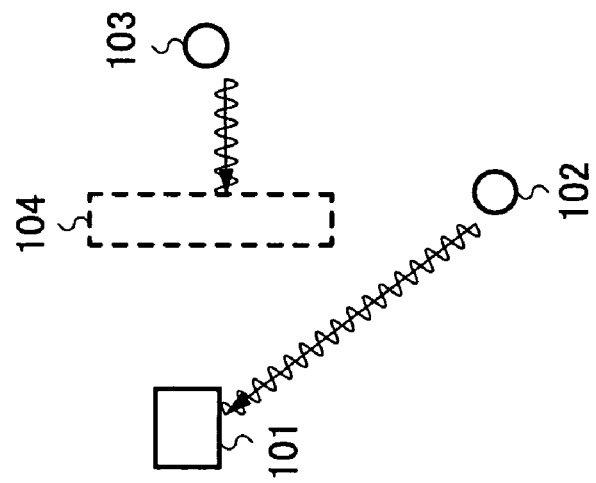
Figure 5:
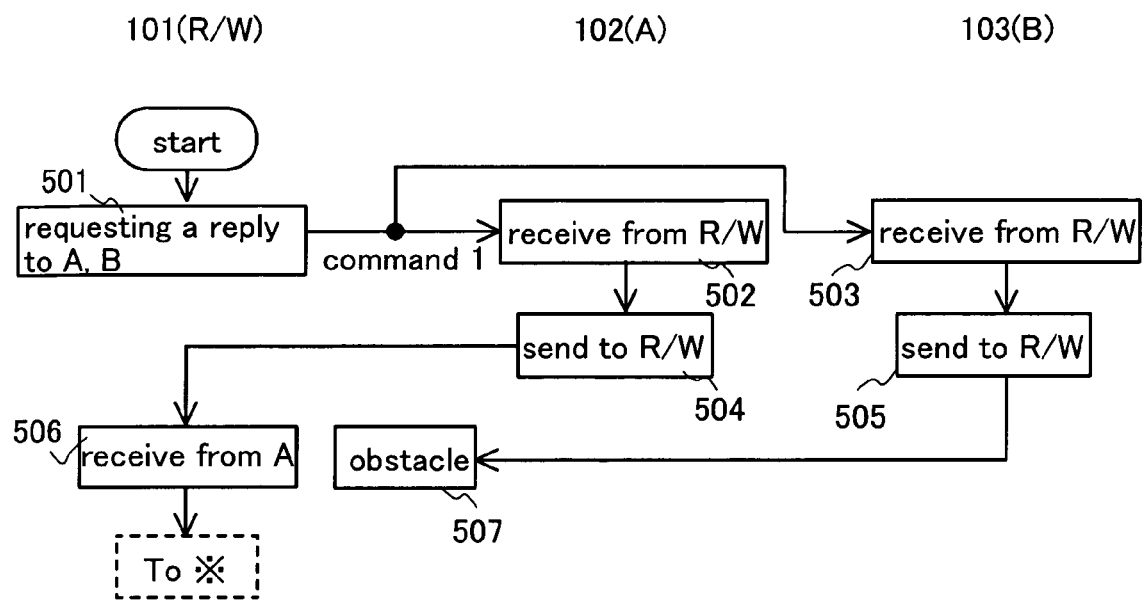
FIG. 5 is a flowchart illustrating a wireless communication method of Embodiment Mode 1.

First, the first wireless signal for requesting a reply is transmitted from the communication device 101 to the semiconductor device 102 and the semiconductor device 103 which are in a detectable range (FIG. 2A and step 501 in FIG. 5). Note that the first wireless signal carries data of a first instruction (also referred to as a command 1) for transmitting the identification number stored in the semiconductor device 102 and the semiconductor device 103 to the communication device 101 so that the communication device 101 identifies an individual. Then, the first wireless signal including the first instruction, which is transmitted from the communication device 101, is received by the semiconductor device 102 (FIG. 2A and step 502 in FIG. 5). The first wireless signal including the first instruction, which is transmitted from the communication device 101, is also received by the semiconductor device 103 through the obstacle 104 (FIG. 2A and step 503 in FIG. 5).

Note that the identification number stored in the semiconductor device 102 and the semiconductor device 103, which is described in this embodiment mode, is not limited to data of the identification number. The identification number possibly includes data of another semiconductor device which is overwritten by a storage element of the semiconductor device 102 or the semiconductor device 103 or data of a sensor or the like incorporated in a semiconductor device. Therefore, such data is collectively called data stored in the semiconductor device.

Next, the semiconductor device 102 and the semiconductor device 103 transmit the second wireless signal including data stored in the semiconductor device 102 and the semiconductor device 103 to the communication device 101 in order to reply to the first instruction (FIG. 2B and steps 504 and 505 in FIG. 5). The second wireless signal transmitted from the semiconductor device 102 to the communication device 101 is received by the communication device (FIG. 2B and step 506 in FIG. 5). On the other hand, the second wireless signal transmitted from the semiconductor device 103 to the communication device 101 is not received by the communication device 101 because there is the obstacle 104 (FIG. 2B and step 507 in FIG. 5). Note that the second wireless signal transmitted from the semiconductor device 103 to the communication device 101 is not received by the communication device 101 unlike the first wireless signal due to the obstacle 104. This is because while the communication device is connected to an external power source and thereby the intensity of the first wireless signal can be increased, a semiconductor device is not connected to an external power source, so that it is difficult to increase the intensity of the second wireless signal.

Figure 3B:
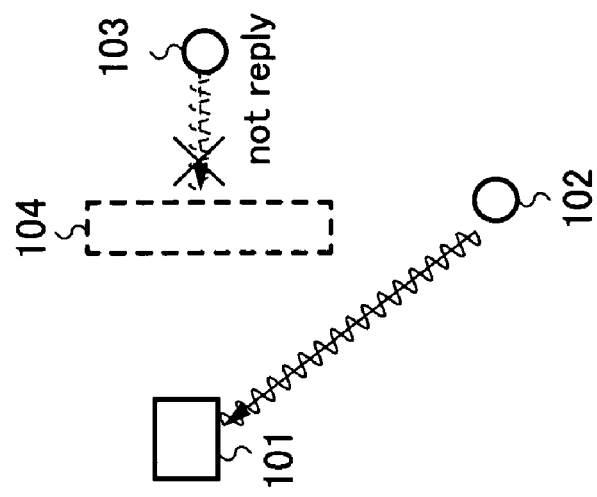
FIGS. 3A and 3B are diagrams each illustrating a wireless communication method of Embodiment Mode 1.
Figure 3A:
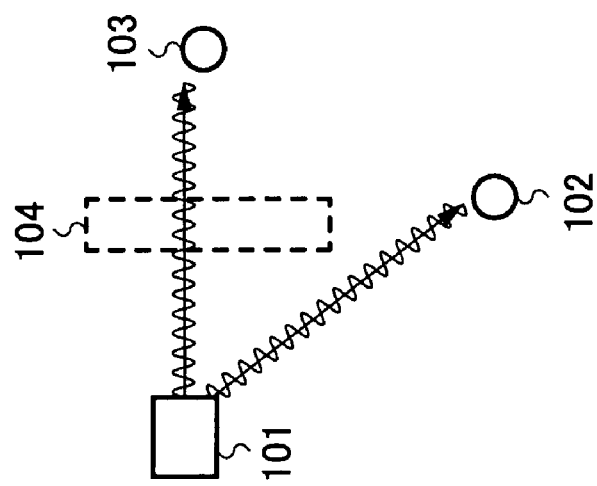
Figure 6:
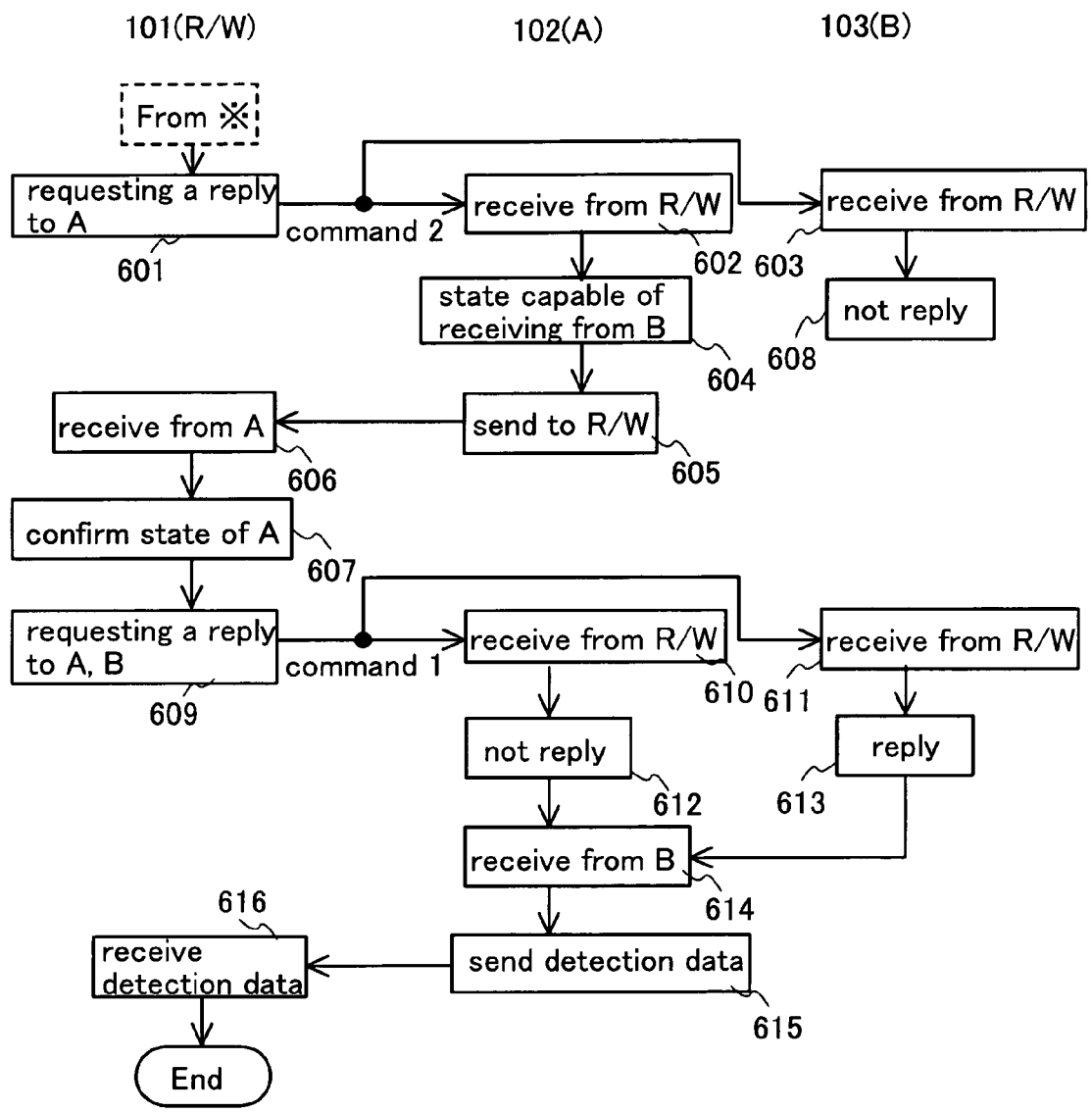
FIG. 6 is a flowchart illustrating a wireless communication method of Embodiment Mode 1.

Next, the communication device 101 transmits the first wireless signal for selectively requesting a reply to the semiconductor device 102 which has replied among a plurality of semiconductor devices in a detectable range (FIG. 3A and step 601 in FIG. 6). Note that in response to the first wireless signal in the step 601 of FIG. 6, carried is data of a second instruction (also referred to as a command 2) for selectively switching between a first state in which a selected semiconductor device receives the first wireless signal transmitted from the communication device 101 and replies to the communication device 101 and a second state in which a selected semiconductor device receives the second wireless signal transmitted from another semiconductor device and replies to the communication device 101. Then, the first wireless signal including the second instruction which is transmitted from the communication device 101 is received by the semiconductor device 102 (FIG. 3A and step 602 in FIG. 6). The first wireless signal including the second instruction which is transmitted from the communication device 101 is also received by the semiconductor device 103 through the obstacle 104 (FIG. 3A and step 603 in FIG. 6).

Next, the semiconductor device 102 receives the first wireless signal including the second instruction and thus is switched from the first state in which a selected semiconductor device receives the first wireless signal transmitted from the communication device 101 to the second state in which a selected semiconductor device can receive the second wireless signal transmitted from the semiconductor device 103 which is another semiconductor device (step 604 in FIG. 6). The semiconductor device 102 which is switched into the second state transmits a signal indicating that it has been switched into the second state to the communication device 101 in response to the second wireless signal (FIG. 3B and step 605 in FIG. 6). The communication device 101 receives the second wireless signal from the semiconductor device 102 (step 606 in FIG. 6) and confirms that the semiconductor device 102 is in the second state in which a selected semiconductor device can receive the second wireless signal transmitted from the semiconductor device 103 which is another semiconductor device (step 607 in FIG. 6). On the other hand, the semiconductor device 103 receives the first wireless signal including the second instruction but does not reply to the communication device 101 because the second instruction is for selectively switching the state of the semiconductor device 102 (FIG. 3B and step 608 in FIG. 6).

Note that it is assumed that the plurality of semiconductor devices described in this embodiment mode are all in the first state, as the initial condition. They may be in the second state as the initial condition. In that case, switching from the second state to the first state may be performed once in response to the first wireless signal.

Figure 4B:
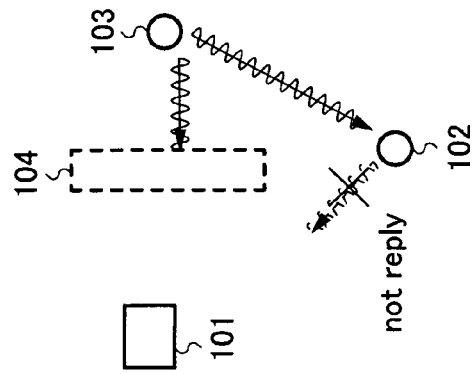
FIGS. 4A to 4C are diagrams each illustrating a wireless communication method of Embodiment Mode 1.
Figure 4A:
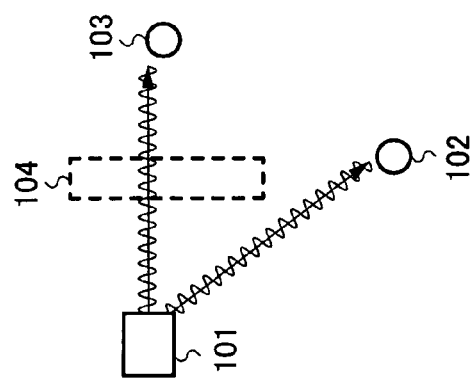
Figure 4C:
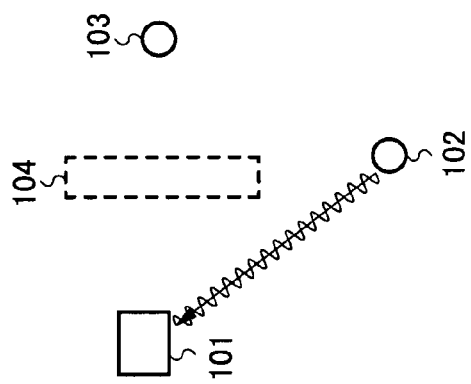

Next, the first wireless signal including the first instruction is transmitted to the semiconductor devices 102 and 103 from the communication device 101 again (FIG. 4A and step 609 in FIG. 6). The first wireless signal including the first instruction, which is transmitted from the communication device 101, is received by the semiconductor device 102 (FIG. 4A and step 610 in FIG. 6). The first wireless signal including the first instruction, which is transmitted from the communication device 101, is also received by the semiconductor device 103 through the obstacle 104 (FIG. 4A and step 611 in FIG. 6). The semiconductor device 102 receives the first wireless signal including the first instruction but does not reply to the communication device 101 because the semiconductor device 102 has been switched into the second state in the step 604 (FIG. 4B and step 612 in FIG. 6). On the other hand, the semiconductor device 103 is in the first state and thus the second wireless signal including data of the identification number which is stored in the semiconductor device 103 is transmitted. However, the second wireless signal transmitted from the semiconductor device 103 to the communication device 101 is not received by the communication device 101 due to the obstacle 104 as described above. The second wireless signal transmitted from the semiconductor device 103 to the communication device 101 is transmitted to the semiconductor device 102 which is within a distance from which the second wireless signal can reach (transmission and reception) the communication device 101 and transmitted to the semiconductor device 102 which is in the second state (FIG. 4B and step 613 in FIG. 6). The semiconductor device 102 which is in the second state can receive the second wireless signal transmitted from the semiconductor device 103 to the communication device 101 regardless of the location of the obstacle (FIG. 4B and step 614 in FIG. 6). Upon receiving the second wireless signal, the semiconductor device 102 transmits to the communication device 101 the second wireless signal including detection data for indicating whether there is any semiconductor device, which could not transmit the second wireless signal in response to the first wireless signal from the communication device 101, in the vicinity of the semiconductor device 102 (FIG. 4C and step 615 in FIG. 6). The second wireless signal including detection data transmitted from the semiconductor device 102 is received by the communication device 101 (FIG. 4C and step 616 in FIG. 6).

Note that the semiconductor device in the second state can transmit received data which is superimposed on the second wireless signal including detection data to the communication device with power obtained by receiving the first wireless signal from the communication device. Therefore, the semiconductor device in the second state can transmit and receive the second wireless signal more reliably.

The schematic diagrams and flowcharts which illustrate transmission and reception of the first wireless signal and the second wireless signal in the case where there is an obstacle are described above. Next, transition of the intensity of the first wireless signal and the second wireless signal in this embodiment mode when the first wireless signal or the second wireless signal travels through the communication device, a space in which the first wireless signal and the second wireless signal propagate, the semiconductor devices, and the obstacle will be exemplified, and advantages of the wireless communication method of this embodiment mode will be described in detail.

Figure 7A:
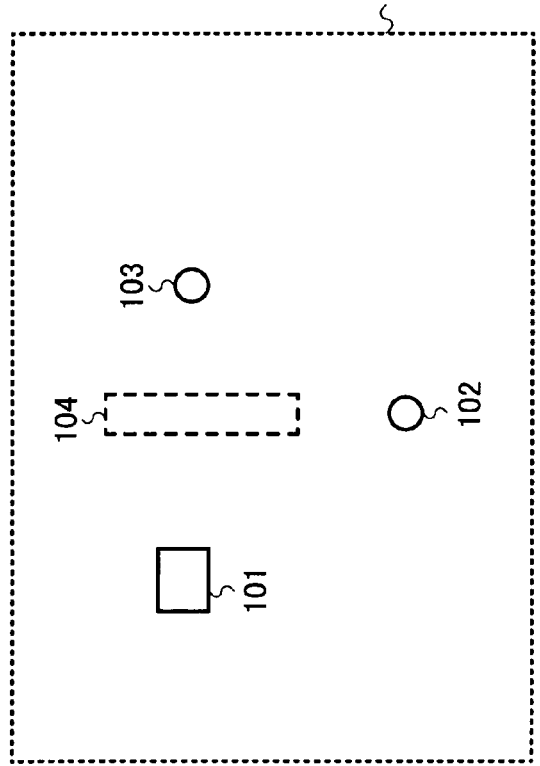
FIGS. 7A to 7C are diagrams each illustrating a wireless communication method of Embodiment Mode 1.
Figure 7B:
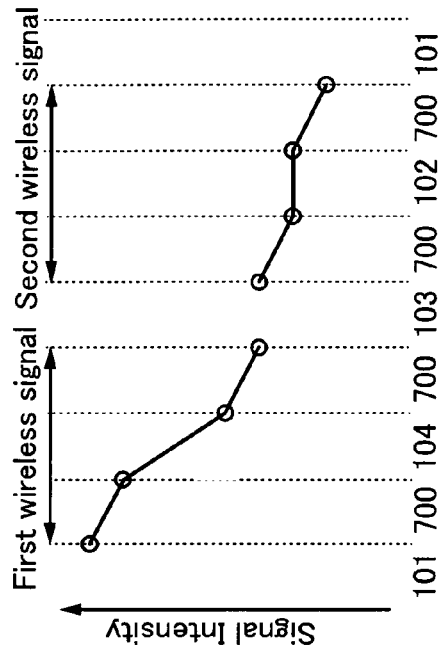
Figure 7C:
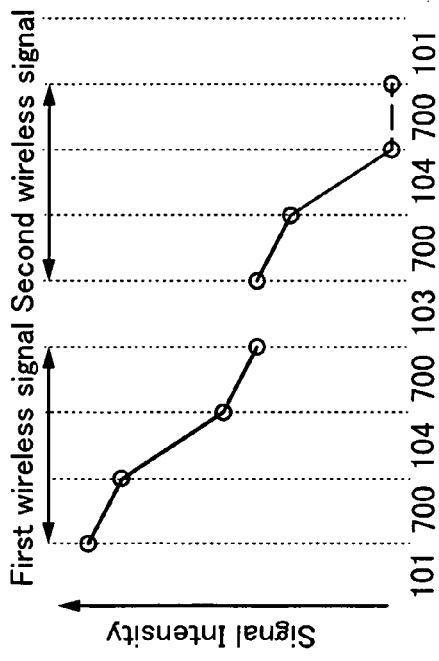

FIG. 7A shows the location of the communication device 101, the semiconductor device 102, the semiconductor device 103, the obstacle 104, and a propagation space 700. Further, FIG. 7B shows transmission and reception of the wireless signals between the communication device 101 and the semiconductor device 103 through the obstacle 104 in the case of the location shown in FIG. 7A. FIG. 7C shows transmission and reception of the wireless signals between the communication device 101 and the semiconductor device 103 through the semiconductor device 102 in the case of the location shown in FIG. 7A.

In FIG. 7B, the first wireless signal transmitted from the communication device 101 to the semiconductor device 103 is received by the semiconductor device 103 through the propagation space 700, the obstacle 104, and the propagation space 700. The signal intensity during this time is gradually reduced through the propagation space 700 and the obstacle 104. Note that reduction in the signal intensity is mainly due to the obstacle 104. Therefore, reduction in the signal intensity is significant, so that it is difficult that the second wireless signal transmitted from the semiconductor device 103 to the communication device 101 is received again by the communication device 101 through the propagation space 700, the obstacle 104, and the propagation space 700.

On the other hand, in FIG. 7C illustrating the wireless communication method of this embodiment mode, the first wireless signal transmitted from the communication device 101 to the semiconductor device 103 is received by the semiconductor device 103 through the propagation space 700, the obstacle 104, and the propagation space 700 similarly to FIG. 7B. The signal intensity during this time is gradually reduced through the propagation space 700 and the obstacle 104. Note that reduction in the signal intensity is mainly due to the obstacle 104. However, according to the wireless communication method described in this embodiment mode, the second wireless signal transmitted from the semiconductor device 103 to the communication device 101 can propagate through the propagation space 700, the semiconductor device 102, and the propagation space 700. Reduction in the propagation intensity in the case of propagation through the propagation space 700 is smaller than that in the case of propagation through the obstacle 104. Further, the second wireless signal can be received by the communication device 101 through the semiconductor device 102 to which enough power is supplied from the communication device 101. The communication device 101 can recognize the semiconductor device which has difficulty in transmitting and receiving the wireless signal due to the obstacle 104.

With the above-described mode, when communication from a semiconductor device to a communication device is difficult due to an external factor such as an obstacle, communication from the semiconductor device to the communication device can be ensured by way of another semiconductor device. Therefore, a wireless communication method, by which in the case where communication of a wireless signal from a communication device to a semiconductor device can be ensured, communication of a wireless signal can be ensured without using a repeater even when communication of a wireless signal from a semiconductor device to a communication device is difficult due to an external factor such as an obstacle, can be provided.

Note that this embodiment mode can be implemented in combination with any of technical elements of the other embodiment modes in this specification.

Embodiment Mode 2

In the structure described in Embodiment Mode 1, operation is performed in selectively switching between a first state in which a selected semiconductor device receives a first wireless signal transmitted from a communication device and replies to the communication device and a second state in which a selected semiconductor device receives a second wireless signal transmitted from a semiconductor device and replies to the communication device, in response to the first wireless signal transmitted from the communication device, so that the second wireless signal which could not be transmitted from the semiconductor device due to an obstacle is transmitted to the communication device by way of another semiconductor device. In this embodiment mode, a structure is described in which the second wireless signal from the semiconductor device, which could not be transmitted due to the obstacle, is held in a storage element in another semiconductor device once and data in the storage element is read by the communication device in response to the first wireless signal from the communication device. In this embodiment mode, description is made with reference to schematic diagrams and flowcharts illustrating transmission and reception of the first wireless signal and the second wireless signal as in Embodiment Mode 1. Note that in this embodiment mode, part of schematic diagrams and flowcharts, which illustrates transmission and reception of the first wireless signal and the second wireless signal, is identical to that in Embodiment Mode 1, and therefore, the diagram described in Embodiment Mode 1 is also used as necessary. Note that in the flowchart of FIG. 8, the communication device 101, the semiconductor device 102, and the semiconductor device 103 are abbreviated to "R/W", "A", and "B", respectively, as in the flowcharts of FIGS. 5 and 6.

Figure 8:
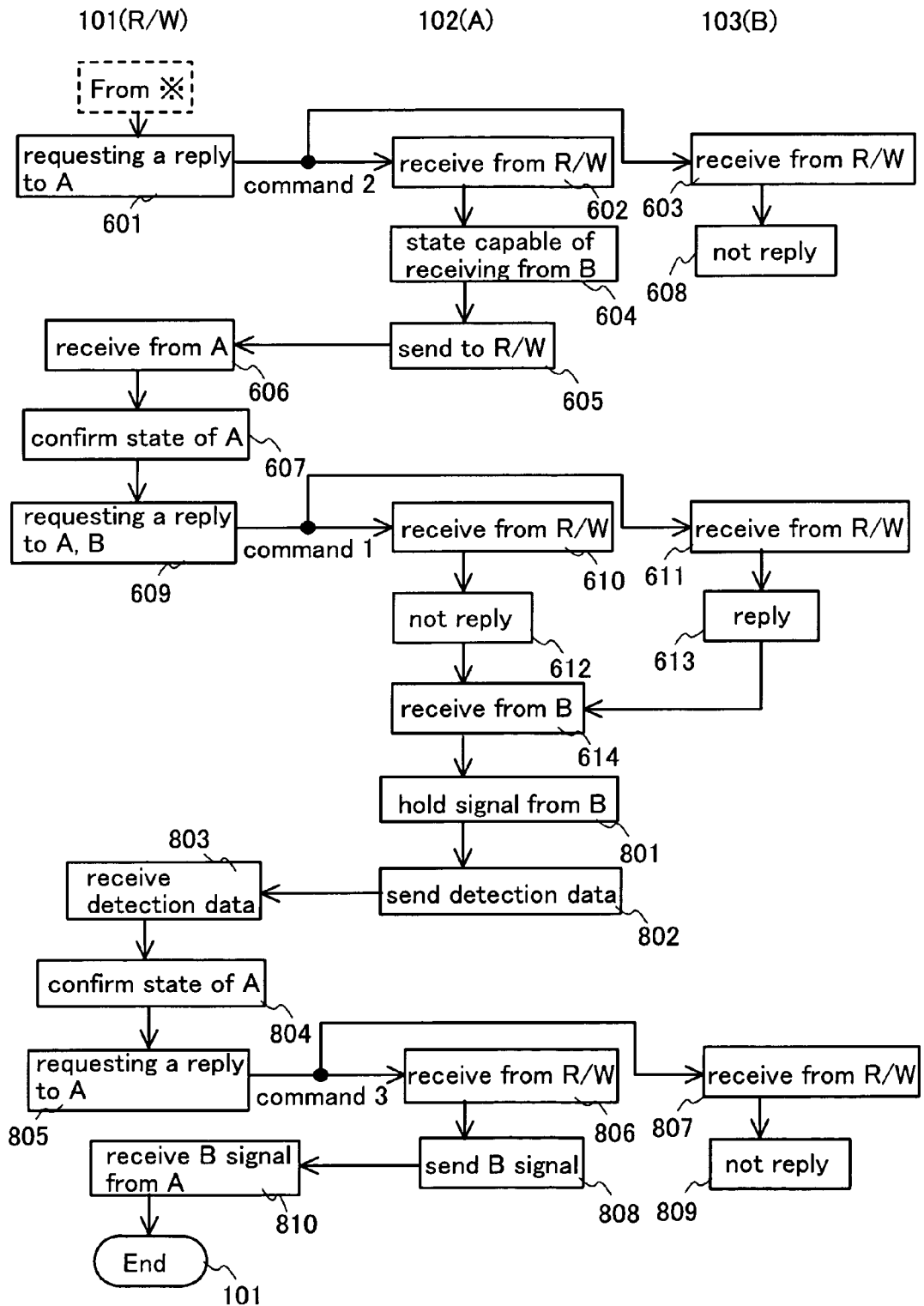
FIG. 8 is a flowchart illustrating a wireless communication method of Embodiment Mode 2.
Figure 9A:
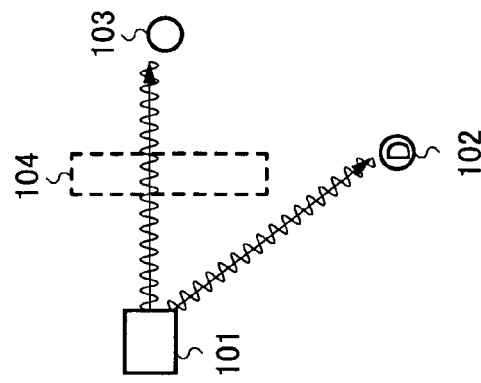
FIGS. 9A to 9C are diagrams each illustrating a wireless communication method of Embodiment Mode 2.

Note that because the structure of the wireless communication method in this embodiment mode may be the same as the structure used in the step 614 in Embodiment Mode 1 (FIGS. 6 and 4B), the above description is used as a reference. The semiconductor device 102 in the second state in the step 614 can receive the second wireless signal regardless of the position of an obstacle and data of the identification number which is stored in the semiconductor device 103 is held in the storage element in the semiconductor device 102 (FIG. 9A and step 801 in FIG. 8). Upon receiving the second wireless signal, the semiconductor device 102 transmits to the communication device 101 the second wireless signal including detection data for indicating that data of the identification number of the semiconductor device 103 which could not transmit the second wireless signal in response to the first wireless signal from the communication device 101 is held (FIG. 9A and step 802 in FIG. 8). The second wireless signal including detection data transmitted from the semiconductor device 102 is received by the communication device 101 (FIG. 9A and step 803 in FIG. 8). The communication device 101 confirms that the semiconductor device 102 receives the second wireless signal from another semiconductor device and holds the identification number in the storage element (step 804 in FIG. 8).

Note that the semiconductor device 102 in the second state of this embodiment mode holds data of the identification number stored in the semiconductor device 103 which is received in response to the second wireless signal, in the storage element in the semiconductor device 102. Data of the identification number of the semiconductor device 103 is held in the storage element of the semiconductor device 102 with power obtained by reception of the first wireless signal from the communication device by the semiconductor device 102.

The identification number stored in the semiconductor device 102 and the semiconductor device 103, which is described in this embodiment mode, is not limited to data of the identification number as in Embodiment Mode 1. The identification number may include data of another semiconductor device, which is overwritten by a storage element of the semiconductor device 102 or the semiconductor device 103, or data of a sensor or the like incorporated in a semiconductor device. Therefore, such data is collectively called data stored in the semiconductor device.

Figure 9B:
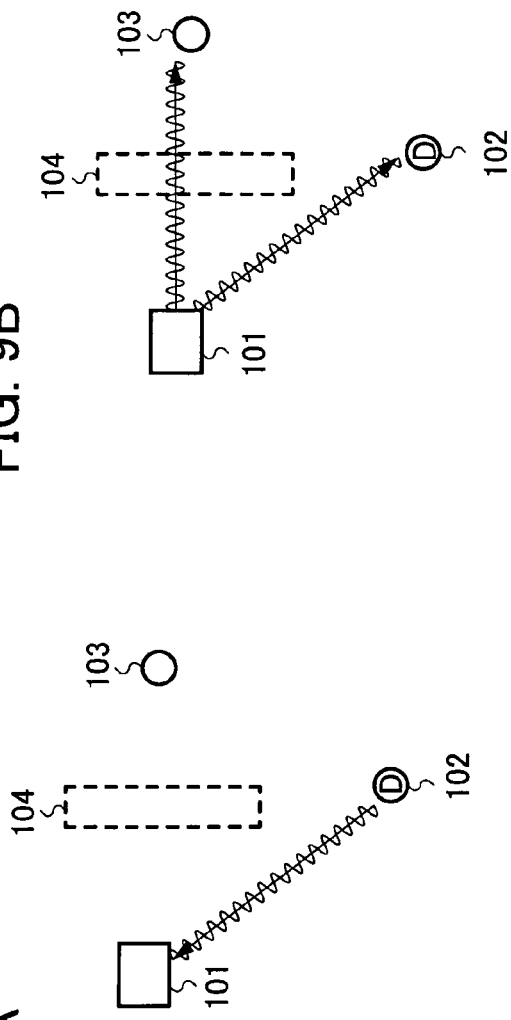

Next, the communication device 101 transmits the first wireless signal for requesting a reply to the semiconductor device 102 which holds the identification number in the storage element in response to the second wireless signal from the other semiconductor device, that is, the semiconductor device 103 (FIG. 9B and step 805 in FIG. 8). Note that the first wireless signal in the step 805 in FIG. 8 carries data of a third instruction (also referred to as a command 3) for reading the held identification number from the semiconductor device which holds the identification number in the storage element, which is inputted in response to the second wireless signal from the other semiconductor device. Then, the first wireless signal including the third instruction, which is transmitted from the communication device 101, is received by the semiconductor device 102 (FIG. 9B and step 806 in FIG. 8). The first wireless signal including the third instruction, which is transmitted from the communication device 101, is also received by the semiconductor device 103 through the obstacle 104 (FIG. 9B and step 807 in FIG. 8).

Figure 9C:
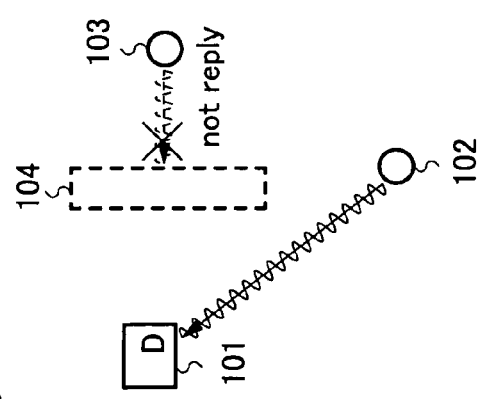

Next, the semiconductor device 102 receives the first wireless signal including the third instruction and thus transmits to the communication device 101 the identification number of the other semiconductor device, which is stored in the storage element of the semiconductor device 102, that is, the identification number of the semiconductor device 103 in this embodiment mode, in response to the second wireless signal (FIG. 9C and step 808 in FIG. 8). On the other hand, the semiconductor device 103 receives the first wireless signal including the third instruction but does not reply to the communication device 101 because the third instruction is for recognizing the state of the semiconductor device 102 to selectively transmit and receive the wireless signal (FIG. 9C and step 809 in FIG. 8). The second wireless signal including the identification number of the semiconductor device 103, which is transmitted from the semiconductor device 102, is received by the communication device 101 (FIG. 9C and step 810 in FIG. 8).

With the above-described mode, when communication from a semiconductor device to a communication device is difficult due to an external factor such as an obstacle, communication from the semiconductor device to the communication device can be ensured by way of another semiconductor device. Therefore, a wireless communication method, by which in the case where communication of a wireless signal from a communication device to a semiconductor device can be ensured, communication of a wireless signal can be ensured without using a repeater even when communication of a wireless signal from a semiconductor device to a communication device is difficult due to an external factor such as an obstacle, can be provided. In particular, with the structure of the wireless communication method described in this embodiment mode, the identification number of the semiconductor device which has difficulty in transmission of a wireless signal due to an obstacle or the like is held in a semiconductor device, which can transmit and receive a wireless signal to and from a communication device, once and thus can transmit and receive a wireless signal to and from the communication device.

Note that this embodiment mode can be implemented in combination with any of technical elements of the other embodiment modes in this specification.

Embodiment Mode 3

In this embodiment, the structure of the semiconductor device in the wireless communication method described in Embodiment Modes 1 and 2 is described.

Figure 10:
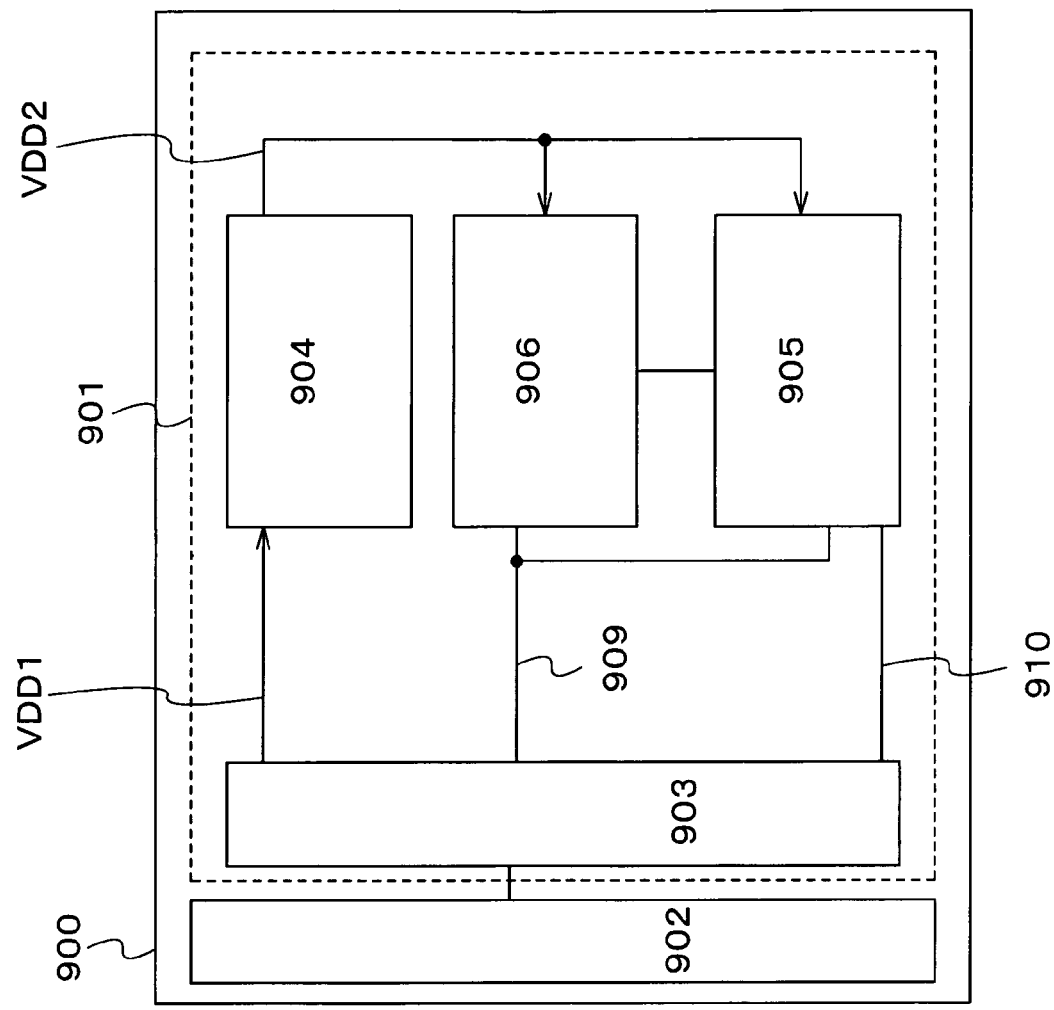
FIG. 10 is a block diagram showing a semiconductor device of Embodiment Mode 3.

The structure of the semiconductor device in the wireless communication method described in Embodiment Modes 1 and 2 is described with reference to FIG. 10. FIG. 10 is a block diagram of the inside of the semiconductor device. A semiconductor device 900 includes an antenna 902 and a semiconductor integrated circuit 901. The semiconductor integrated circuit 901 includes a transmitting and receiving circuit 903, a power supply circuit 904, a control circuit 905, and a storage element 906.

Figure 12:
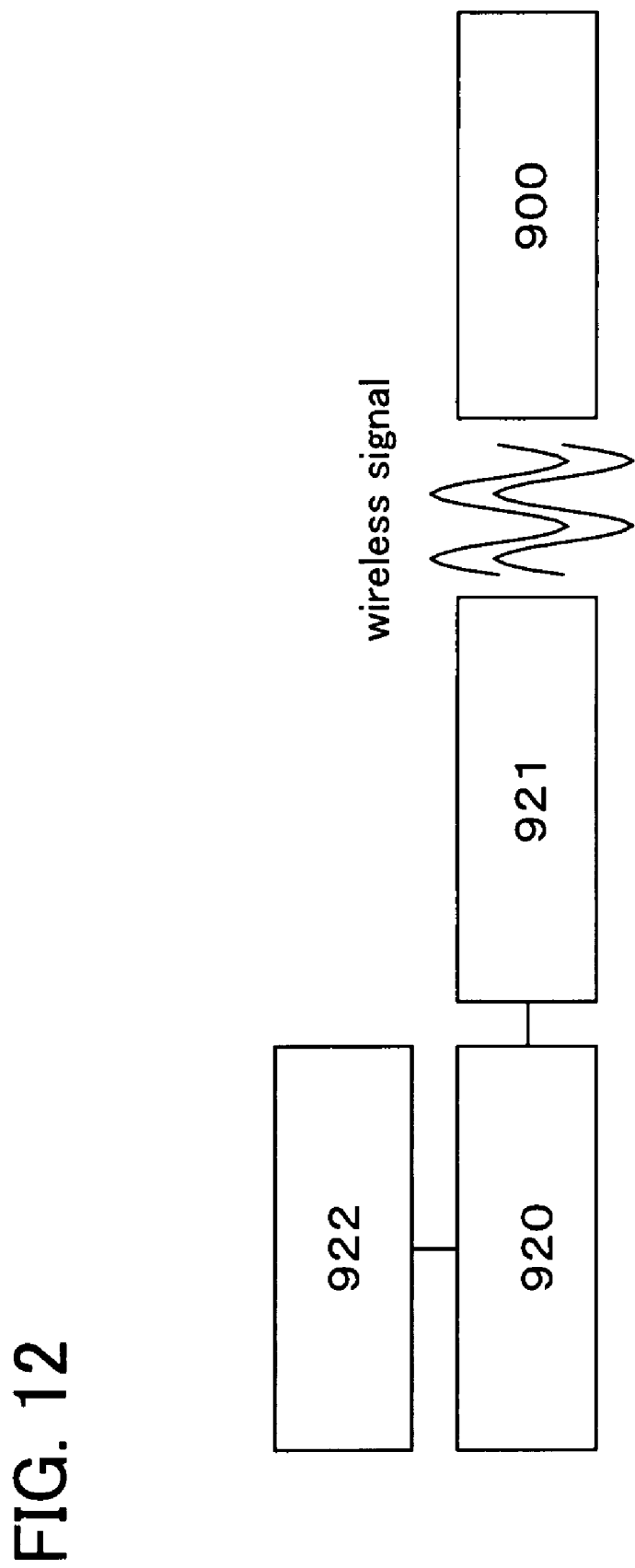
FIG. 12 is a block diagram showing a semiconductor device of Embodiment Mode 3.

Next, operation of the semiconductor device is described with reference to FIGS. 10 and 12. As shown in FIG. 12, a signal (first wireless signal) obtained by modulation of a carrier wave is transmitted from an antenna unit 921 which is connected to a control terminal 922 through a communication device 920. Here, the wireless signal includes an instruction from the communication device 920 to the semiconductor device 900.

In FIG. 10, the antenna 902 included in the semiconductor device 900 receives the first wireless signal. Then, the received first wireless signal is transmitted to each circuit block through the transmitting and receiving circuit 903 which is connected to the antenna 902. The power supply circuit 904, the control circuit 905, and the storage element 906 are connected to the transmitting and receiving circuit 903.

A first high power supply potential (VDD1) and a second high power supply potential (VDD2) are generated by a rectification function of the transmitting and receiving circuit 903 and the power supply circuit 904, respectively. In this embodiment, the second high power supply potential VDD2 of the two high power supply potentials is supplied to each circuit block of the semiconductor integrated circuit 901. Note that in this embodiment mode, a low power supply potential (VSS) is common. Here, the power supply circuit 904 is configured with a constant voltage circuit.

The rectification function of the transmitting and receiving circuit 903 and operation of the power supply circuit 904 are briefly described. For example, a case is considered where the transmitting and receiving circuit 903 is formed of one rectifier circuit to obtain a rectification function and the power supply circuit 904 is formed of a constant voltage circuit. Here, as a rectifier circuit performing a rectification function, a diode and a capacitor can be used. The wireless signal transmitted to the transmitting and receiving circuit 903 through the antenna 902 is inputted to the rectifier circuit and rectified. Then, the rectified wireless signal is smoothed by a capacitor of the rectifier circuit and thus the first high power supply potential (VDD1) is generated. The generated VDD1 passes through the constant voltage circuit to be a stable potential (the second high power supply potential, VDD2) lower than an input voltage. VDD2 which is an output voltage of the constant voltage circuit is supplied as power to each circuit block. Note that the generated VDD1 may be supplied as power to each circuit block. Further, both VDD1 and VDD2 may be supplied to each circuit block. It is desirable that whether VDD1 or VDD2 is supplied be determined depending on the operating condition and the usage of each circuit block.

In the semiconductor device shown in FIG. 10, the constant voltage circuit has a function of substantially stabilizing a DC voltage and may be any circuit which can roughly stabilize a DC voltage by using a voltage, a current, or both a voltage and a current.

A demodulation signal 909 is generated by a demodulation function of the transmitting and receiving circuit 903. The generated demodulation signal 909 is supplied to each circuit block. The transmitting and receiving circuit 903 and the control circuit 905 are connected to each other and the demodulation signal 909 generated by the transmitting and receiving circuit 903 is supplied to the control circuit 905.

The control circuit 905 includes a reset circuit. A reset signal is generated by the reset circuit. The reset signal is a signal for resetting the semiconductor device 900.

The control circuit 905 includes a clock generating circuit. A basic clock signal is generated by the clock generating circuit based on the demodulation signal 909 transmitted through the transmitting and receiving circuit 903. The basic clock signal generated by the clock generating circuit is used in a circuit in the control circuit.

Further, the control circuit 905 extracts and identifies an instruction transmitted to the semiconductor device 900 from the communication device 920 from the demodulation signal 909 transmitted through the transmitting and receiving circuit 903. The control circuit 905 also has a role of controlling the storage element 906.

Thus, the control circuit 905 identifies the instruction transmitted from the communication device 920 and the storage element 906 is operated by the identified instruction. Then, a signal which includes data stored in the storage element 906 or stored data such as the identification number written in the storage element 906 is outputted. Alternatively, information transmitted from the communication device 920 is stored in the storage element 906.

Here, for the storage element 906, a DRAM (dynamic random access memory), an SRAM (static random access memory), an FeRAM (ferroelectric random access memory), a mask ROM (read only memory), an EPROM (electrically programmable read only memory), an EEPROM (electrically erasable and programmable read only memory), or a flash memory can be used.

Further, the control circuit 905 has also a role of converting a signal including unique data such as the identification number stored or written in the storage element 906 into a signal encoded by an encoding method which meets a standard such as ISO. A signal transmitted to the antenna 902 is modulated by the transmitting and receiving circuit 903 in accordance with an encoded signal 910.

The modulated signal is received by the antenna unit 921 connected to the communication device 920. Then, the received signal is analyzed by the communication device 920 and thus the specific data of the semiconductor device 900, such as the identification number, can be identified.

In this embodiment mode, an example is described in which communication is performed between the semiconductor device 900 and the communication device 920 by modulation of a carrier wave. The frequency of the carrier wave is, depending on a standard, 125 kHz, 13.56 MHz, 950 MHz, or the like. A demodulation method is, depending on a standard, amplitude modulation, frequency modulation, phase modulation, or the like; however, any modulation method may be used as long as it meets a standard.

Signal transmission methods can be categorized into an electromagnetic coupling method, an electromagnetic induction method, a microwave method, and the like in accordance with the wavelength of a carrier wave. Note that in the case where a wireless signal is transmitted and received between the semiconductor device and the communication device within a long distance, a microwave method is desirably selected.

In this embodiment mode, "connected" means "electrically connected". Therefore, another element or the like may be provided between certain portions which are connected in circuits.

Note that this embodiment mode can be implemented in combination with a technical element of any of the other embodiment modes in this specification.

Embodiment Mode 4

In this embodiment mode, a mode is described in which a transistor is fabricated using a semiconductor film formed over an insulating substrate to form a semiconductor device.

First, a release layer 1602 is formed on one surface of a substrate 1601, and then an insulating film 1603 to be a base and an amorphous semiconductor film 1604 (for example, a film containing amorphous silicon) are formed (FIG. 13A). The release layer 1602, the insulating film 1603, and the amorphous semiconductor film 1604 can be successively formed. Being formed successively, they are not exposed to the air and thus mixture of an impurity can be prevented.

As the substrate 1601, a glass substrate, a quartz substrate, a metal substrate, a stainless steel substrate, a plastic substrate which has heat resistance to a process temperature in the process in this embodiment mode, or the like is preferably used. Such a substrate has no significant limitation on its area or its shape. Thus, for example, in a case of using a substrate which is a rectangular shape having a side length of 1 meter or longer, productivity can be significantly increased. Such a merit is greatly advantageous as compared to a case of using a circular silicon substrate. Therefore, even in a case of forming an integrated circuit portion or an antenna larger, the cost can be low as compared to the case of using a silicon substrate.

Note that while the release layer 1602 is formed over an entire surface of the substrate 1601 in this process, the release layer 1602 may be selectively formed as necessary by a photolithography method after a release layer is formed over an entire surface of the substrate 1601. Further, while the release layer 1602 is formed so as to be in contact with the substrate 1601, it is also allowed that an insulating film such as a silicon oxide ($SiO_x$) film, a silicon oxynitride ($SiO_xN_y$) (x>y) film, a silicon nitride ($SiN_x$) film, or a silicon nitride oxide ($SiN_xO_y$) (x>y) film is formed and the release layer 1602 is formed so as to be in contact with the insulating film, as necessary.

As the release layer 1602, a metal film, a layered structure of a metal film and a metal oxide film, or the like can be used. The metal film is formed to have a single-layer structure or a layered structure of a film formed of an element selected from tungsten (W), molybdenum (Mo), titanium (Ti), tantalum (Ta), niobium (Nb), nickel (Ni), cobalt (Co), zirconium (Zr), zinc (Zn), ruthenium (Ru), rhodium (Rh), palladium (Pd), osmium (Os), or iridium (Ir), or an alloy material or a compound material including any of the above elements as its main component. The metal film can be formed by a sputtering method, various CVD methods such as a plasma CVD method, or the like. As the layered structure of a metal film and a metal oxide film, after the above metal film is formed, an oxide or oxynitride of the metal film can be formed on the surface of the metal film by performing plasma treatment in an oxygen atmosphere or an $N_2O$ atmosphere, or heat treatment in an oxygen atmosphere or an $N_2O$ atmosphere. Alternatively, a metal film is formed and then a surface thereof is treated with a highly oxidative solution such as an ozone solution, so that an oxide or oxynitride of the metal film can be formed on the surface of the metal film.

The insulating film 1603 is formed to have a single-layer structure or a layered structure of a film containing oxide of silicon or nitride of silicon by a sputtering method, a plasma CVD method, or the like. In the case where the insulating film to be a base has a two-layer structure, a silicon nitride oxide film may be formed for a first layer, and a silicon oxynitride film may be formed for a second layer, for example. In the case where the insulating film to be a base has a three-layer structure, a silicon oxide film, a silicon nitride oxide film, and a silicon oxynitride film may be formed for a first layer, a second layer, and a third layer, respectively. Alternatively, a silicon oxynitride film, a silicon nitride oxide film, and a silicon oxynitride film may be formed for a first layer, a second layer, and a third layer, respectively. The insulating film to be a base functions as a blocking film for preventing impurities from entering from the substrate 1601.

The semiconductor film 1604 is formed to a thickness of from 25 to 200 nm (preferably, from 30 to 150 nm) by a sputtering method, an LPCVD method, a plasma CVD method, or the like. As the semiconductor film 1604, an amorphous silicon film may be formed, for example.

Next, the amorphous semiconductor film 1604 is crystallized by laser beam irradiation. Note that the amorphous semiconductor film 1604 may be crystallized by a method in which laser beam irradiation is combined with a thermal crystallization method using an RTA or an annealing furnace, or a thermal crystallization method using a metal element for promoting crystallization, or the like. After that, the obtained crystalline semiconductor film is etched so as to have a desired shape, so that semiconductor films 1604a to 1604d are formed. Then, a gate insulating film 1605 is formed so as to cover the semiconductor films 1604a to 1604d (see FIG. 13B).

An example of a manufacturing step of the semiconductor films 1604a to 1604d is briefly described below. First, an amorphous semiconductor film (for example, an amorphous silicon film) with a thickness of from 50 to 60 nm is formed by a plasma CVD method. Next, a solution containing nickel that is a metal element for promoting crystallization is retained on the amorphous semiconductor film, and a dehydrogenation treatment (at 500° C., for one hour) and a thermal crystallization treatment (at 550° C., for four hours) are performed on the amorphous semiconductor film, so that a crystalline semiconductor film is formed. After that, the crystalline semiconductor film is irradiated with laser beam from a laser oscillator, and a photolithography method is used, so that the semiconductor films 1604a to 1604d are formed. Note that without being subjected to the thermal crystallization which uses the metal element for promoting crystallization, the amorphous semiconductor film may be crystallized only by laser beam irradiation.

As a laser oscillator, a continuous wave laser beam (a CW laser beam) or a pulsed wave laser beam (a pulsed laser beam) can be used. As a laser beam which can be used here, a laser beam emitted from one or more of the following can be used: a gas laser such as an Ar laser, a Kr laser, or an excimer laser; a laser of which medium is single crystalline YAG, $YVO_4$, forsterite ($Mg_2SiO_4$), $YAlO_3$, or $GdVO_4$, or polycrystalline (ceramic) YAG, $Y_2O_3$, $YVO_4$, $YAlO_3$, or $GdVO_4$, added with one or more of Nd, Yb, Cr, Ti, Ho, Er, Tm, and Ta as a dopant; a glass laser; a ruby laser; an alexandrite laser; a Ti:sapphire laser; a copper vapor laser; and a gold vapor laser. It is possible to obtain crystals with a large grain size when fundamental waves of such laser beams or second to fourth harmonics of the fundamental waves are used. For example, the second harmonic (532 nm) or the third harmonic (355 nm) of an Nd:$YVO_4$ laser (fundamental wave of 1064 nm) can be used. In this case, a power density of approximately 0.01 to 100 $MW/cm^2$ (preferably, 0.1 to 10 $MW/cm^2$) is necessary. Irradiation is conducted at a scanning rate of approximately 10 to 2000 cm/sec. It is to be noted that, a laser using, as a medium, single crystalline YAG, $YVO_4$, forsterite ($Mg_2SiO_4$), $YAlO_3$, or $GdVO_4$, or polycrystalline (ceramic) YAG, $Y_2O_3$, $YVO_4$, $YAlO_3$, or $GdVO_4$ added with one or more of Nd, Yb, Cr, Ti, Ho, Er, Tm, and Ta as a dopant; an Ar ion laser; or a Ti:sapphire laser can be continuously oscillated. Furthermore, pulse oscillation thereof can be performed at a repetition rate of 10 MHz or more by carrying out Q switch operation, mode locking, or the like. In a case where a laser beam is oscillated at a repetition rate of higher than or equal to 10 MHz, after a semiconductor film is melted by a laser and before it is solidified, the semiconductor film is irradiated with a next pulse. Therefore, unlike a case of using a pulsed laser with a low repetition rate, a solid-liquid interface can be continuously moved in the semiconductor film, so that crystal grains which continuously grow in a scanning direction can be obtained.

Next, a gate insulating film 1605 which covers the semiconductor films 1604a to 1604d is formed. The gate insulating film 1605 is formed to have a single-layer structure or a layered structure of a film containing oxide of silicon or nitride of silicon by a CVD method, a sputtering method, or the like. In specific, the gate insulating film 1605 is formed to have a single-layer structure or a layered structure of a silicon oxide film, a silicon oxinitride film, or a silicon nitride oxide film.

Alternatively, the gate insulating film 1605 may be formed by performing a high-density plasma treatment on the semiconductor films 1604a to 1604d to oxidize or nitride the surfaces thereof. For example, the gate insulating film 1605 is formed by a plasma treatment introducing a mixed gas of a rare gas such as He, Ar, Kr, or Xe and oxygen, nitrogen oxide (NO$_2$), ammonia, nitrogen, hydrogen, or the like. When excitation of the plasma in this case is performed by introduction of a microwave, plasma with a low electron temperature and high density can be generated. By an oxygen radical (there is a case where an OH radical is included) or a nitrogen radical (there is a case where an NH radical is included) generated by this high-density plasma, the surfaces of the semiconductor films can be oxidized or nitrided.

By treatment using such high-density plasma, an insulating film with a thickness of from 1 to 20 nm, typically from 5 to 10 nm, is formed over the semiconductor film. Since the reaction of this case is a solid-phase reaction, interface state density between the insulating film and the semiconductor film can be extremely low. Since such high-density plasma treatment oxidizes (or nitrides) a semiconductor film (crystalline silicon, or polycrystalline silicon) directly, unevenness of a thickness of the insulating film to be formed can be extremely small, ideally. In addition, oxidation is not strengthened even in a crystal grain boundary of crystalline silicon, which makes a very preferable condition. That is, by a solid-phase oxidation of the surface of the semiconductor film by the high-density plasma treatment shown here, an insulating film with good uniformity and low interface state density can be formed without abnormal oxidation reaction in a crystal grain boundary.

As the gate insulating film 1605, an insulating film formed by the high-density plasma treatment may be used by itself, or an insulating film of silicon oxide, silicon oxynitride, silicon nitride, or the like may be formed thereover by a CVD method using plasma or thermal reaction, so as to make a laminate. In any case, transistors each including an insulating film formed by high-density plasma, in a part of the gate insulating film or in the whole gate insulating film, can reduce variation in the characteristics.

Furthermore, a semiconductor film is irradiated with a continuous wave laser beam or a laser beam oscillated at a repetition rate of higher than or equal to 10 MHz and is scanned in one direction for crystallization, so that each of the semiconductor films 1604a to 1604d which has a characteristic that the crystal grows in the scanning direction of the laser beam is obtained. When transistors are provided so that the scanning direction is aligned with the channel length direction (a direction in which carriers flow when a channel formation region is formed) and the above gate insulating layer is used, thin film transistors (TFTs) with less characteristic variation and high field effect mobility can be obtained.

Next, a first conductive film and a second conductive film are stacked over the gate insulating film 1605. Here, the first conductive film is formed to a thickness of from 20 to 100 nm by a plasma CVD method, a sputtering method, or the like, and the second conductive film is formed to a thickness of from 100 to 400 nm. The first conductive film and the second conductive film are formed using an element selected from tantalum (Ta), tungsten (W), titanium (Ti), molybdenum (Mo), aluminum (Al), copper (Cu), chromium (Cr), niobium (Nb), and the like, or an alloy material or a compound material containing the above elements as its main component. Alternatively, they are formed using a semiconductor material typified by polycrystalline silicon doped with an impurity element such as phosphorus. As examples of a combination of the first conductive film and the second conductive film, a tantalum nitride film and a tungsten film, a tungsten nitride film and a tungsten film, a molybdenum nitride film and a molybdenum film, and the like can be given. Since tungsten and tantalum nitride have high heat resistance, heat treatment for thermal activation can be performed after the first conductive film and the second conductive film are formed. In addition, in a case of a three-layer structure instead of a two-layer structure, a layered structure of a molybdenum film, an aluminum film, and a molybdenum film is preferably employed.

Next, a resist mask is formed by a photolithography method, and etching treatment for forming a gate electrode and a gate wiring is performed, so that gate electrodes 1607 are formed over the semiconductor films 1604a to 1604d.

Next, a resist mask is formed by a photolithography method, and an impurity element imparting n-type conductivity is added to the semiconductor films 1604a to 1604d at low concentration by an ion doping method or an ion implantation method. As an impurity element imparting n-type conductivity, an element which belongs to Group 15 may be used. For example, phosphorus (P) or arsenic (As) is used.

Next, an insulating film is formed so as to cover the gate insulating film 1605 and the gate electrodes 1607. The insulating film is formed to have a single-layer structure or a layered structure of a film including an inorganic material such as silicon, an oxide of silicon, or a nitride of silicon, and an organic material such as an organic resin, by a plasma CVD method, a sputtering method, or the like. Next, the insulating film is selectively etched by anisotropic etching for mainly etching in a perpendicular direction, so that insulating films 1608 (also referred to as side walls) which are in contact with side surfaces of the gate electrodes 1607 are formed. The insulating films 1608 are used as masks for doping when LDD (lightly doped drain) regions are formed later.

Next, a resist mask formed by a photolithography method, the gate electrodes 1607, and the insulating films 1608 are used as masks to add an impurity element imparting n-type conductivity to the semiconductor films 1604a to 1604d, so that channel formation regions 1606a, first impurity regions 1606b, and second impurity regions 1606c are formed (see FIG. 13C). The first impurity regions 1606b function as source and drain regions of the thin film transistor, and the second impurity regions 1606c function as LDD regions. The concentration of impurity elements contained in the second impurity regions 1606c is lower than that of impurity elements contained in the first impurity regions 1606b.

Next, an insulating film is formed as a single layer or a laminate so as to cover the gate electrodes 1607, the insulating films 1608, and the like, so that conductive films 1631 which function as source and drain electrodes of the thin film transistor are formed over the insulating film. Consequently, thin film transistors 1630a to 1630d are obtained (FIG. 13D).

The insulating film is formed as a single layer or a laminate using an inorganic material such as an oxide of silicon or a nitride of silicon, an organic material such as polyimide, polyamide, benzocyclobutene, acrylic, or epoxy, a siloxane material, or the like, by a CVD method, a sputtering method, an SOG method, a droplet discharging method, a screen printing method, or the like. Here, the insulating film is formed to have a two-layer structure. A silicon nitride oxide film is formed as a first insulating film 1609, and a silicon oxynitride film is formed as a second insulating film 1610.

It is to be noted that before the insulating films 1609 and 1610 are formed or after either one or both the insulating films 1609 and 1610 are formed, heat treatment for recovering the crystallinity of the semiconductor films 1604a to 1604d, for activating the impurity element which has been added to the semiconductor film, or for hydrogenating the semiconductor film is preferably performed. For the heat treatment, thermal annealing, a laser annealing method, an RTA method, or the like is preferably employed.

The conductive films 1631 are formed in the following manner. The insulating films 1609 and 1610, and the like are etched by a photolithography method, and contact holes are formed to expose the first impurity regions 1606b. Then, a conductive film is formed so as to fill the contact holes and the conductive film is selectively etched so as to form. It is to be noted that before formation of the conductive film, a silicide may be formed over the surfaces of the semiconductor films 1604a to 1604d exposed in the contact holes.

The conductive film 1631 is formed by a CVD method, a sputtering method, or the like to have a single-layer structure or a layered structure with the use of an element selected from aluminum (Al), tungsten (W), titanium (Ti), tantalum (Ta), molybdenum (Mo), nickel (Ni), platinum (Pt), copper (Cu), gold (Au), silver (Ag), manganese (Mn), neodymium (Nd), carbon (C), and silicon (Si), or an alloy material or a compound material containing any of the above elements as its main component. An alloy material containing aluminum as its main component corresponds to a material which contains aluminum as its main component and also contains nickel, or an alloy material which contains aluminum as its main component and also contains nickel and one or both of carbon and silicon, for example. The conductive film 1631 may employ, for example, a layered structure of a barrier film, an aluminum-silicon (Al—Si) film, and a barrier film, or a layered structure of a barrier film, an aluminum-silicon (Al—Si) film, a titanium nitride film, and a barrier film. It is to be noted that a barrier film corresponds to a thin film formed by using titanium, a nitride of titanium, molybdenum, or a nitride of molybdenum. Aluminum and aluminum silicon which have low resistance and are inexpensive are optimal materials for forming the conductive film 1631. In addition, generation of a hillock of aluminum or aluminum silicon can be prevented when upper and lower barrier layers are formed. Furthermore, when the barrier film is formed by using titanium that is a highly-reducible element, even if a thin natural oxide film is formed over the crystalline semiconductor film, the natural oxide film can be reduced so that favorable contact with the crystalline semiconductor film can be obtained.

Figure 16A:
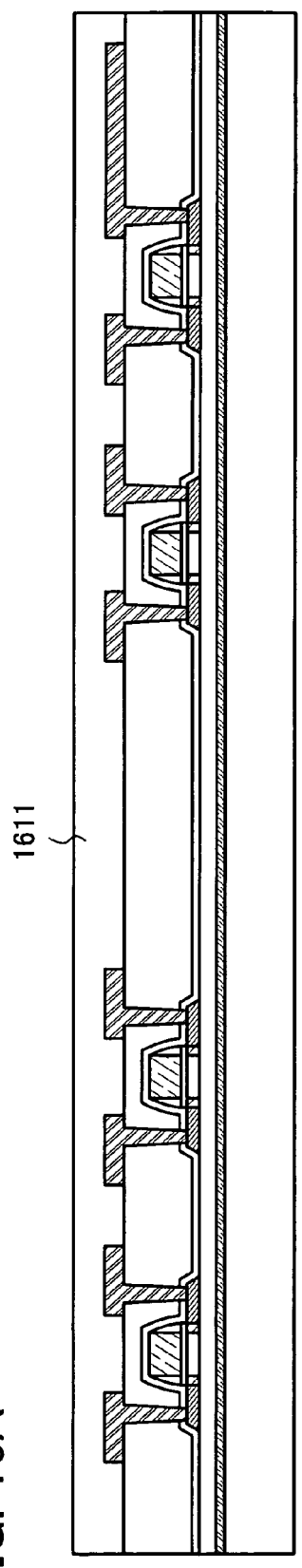
FIGS. 16A and 16B are views showing a method for manufacturing a semiconductor device of Embodiment Mode 4.

Next, an insulating film 1611 is formed so as to cover the conductive films 1631 (FIG. 16A). The insulating film 1611 is formed to have a single-layer structure or a layered structure by using an inorganic material or an organic material by a CVD method, a sputtering method, an SOG method, a droplet discharging method, a screen printing method, or the like. The insulating film 1611 is preferably formed to a thickness of 0.75 to 3 μm.

Figure 16B:
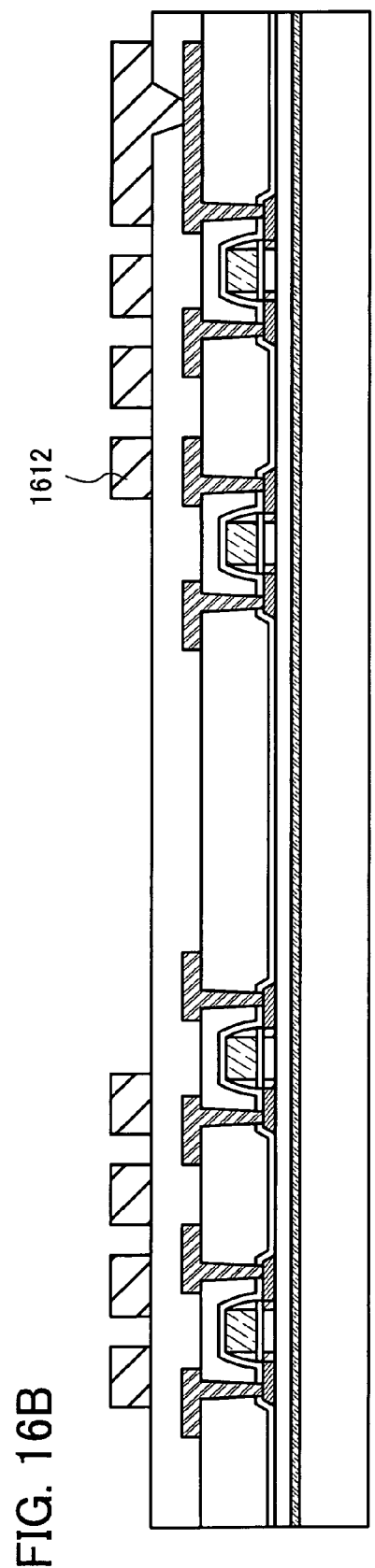

Next, a conductive film 1612 which functions as an antenna is selectively formed on a surface of the insulating film 1611 (FIG. 16B).

The conductive film 1612 is formed in the following manner. After the insulating film 1611 is etched by a photolithography method to form a contact hole which exposes the conductive film 1631, a conductive film is formed so as to fill the contact hole and the conductive film is selectively etched.

Further, the conductive film 1612 may be formed using a conductive material by a CVD method, a sputtering method, a printing method such as screen printing or gravure printing, a plating process, or the like. The conductive material is formed to have a single-layer structure or a layered structure with the use of an element selected from aluminum (Al), titanium (Ti), silver (Ag), copper (Cu), gold (Au), platinum (Pt), nickel (Ni), palladium (Pd), tantalum (Ta), or molybdenum (Mo), or an alloy material or a compound material containing any of the above-described elements as its main component.

For example, in a case of forming the conductive film 1612 functioning as an antenna by a screen printing method, the conductive films can be formed by being selectively printed with conductive paste in which conductive particles each having a grain size of from several nm to several tens of μm are dissolved or dispersed in an organic resin. As the conductive particle, a fine particle or a dispersive nanoparticle of one or more metals of silver (Ag), gold (Au), copper (Cu), nickel (Ni), platinum (Pt), palladium (Pd), tantalum (Ta), molybdenum (Mo), and titanium (Ti) or silver halide can be used. By using a screen printing method, a process can be simplified and cost reduction can be achieved.

Figure 17A:
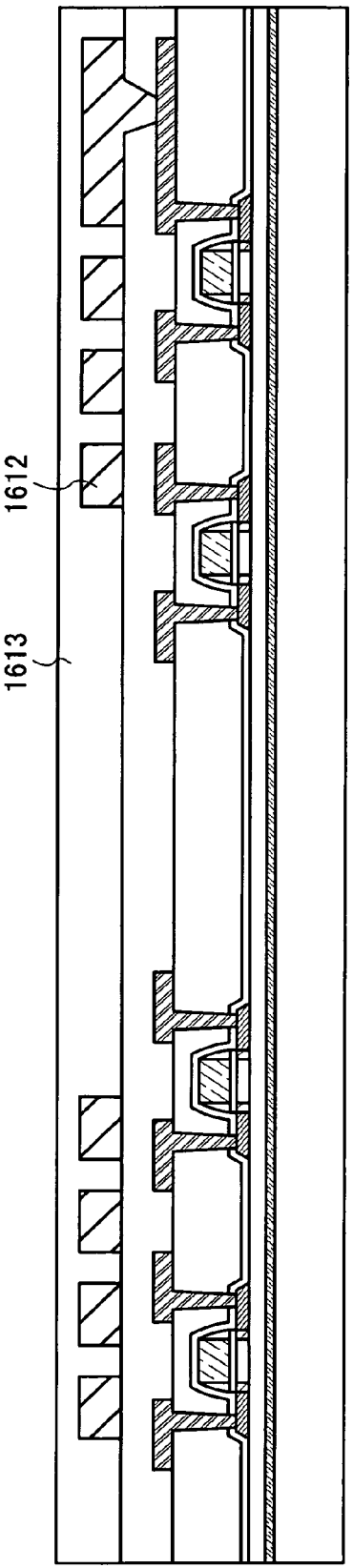
FIGS. 17A and 17B are views showing a method for manufacturing a semiconductor device of Embodiment Mode 4.

Next, an insulating film 1613 is formed so as to cover the conductive film 1612 functioning as an antenna (FIG. 17A).

The insulating film 1613 is formed by a CVD method, a sputtering method, an SOG method, a droplet discharging method, a screen printing method, or the like to have a single-layer structure of an inorganic material such as an oxide of silicon or a nitride of silicon (for example, a silicon oxide film, a silicon oxynitride film, a silicon nitride film, or a silicon nitride oxide film); or an organic material such as polyimide, polyamide, benzocyclobutene, acrylic, or epoxy; a siloxane material; or the like or a layered structure of any of the above.

Next, an element formation film including the thin film transistors 1630a to 1630d and the conductive film 1612 which functions as an antenna, and the like is released from the substrate 1601.

Figure 17B:
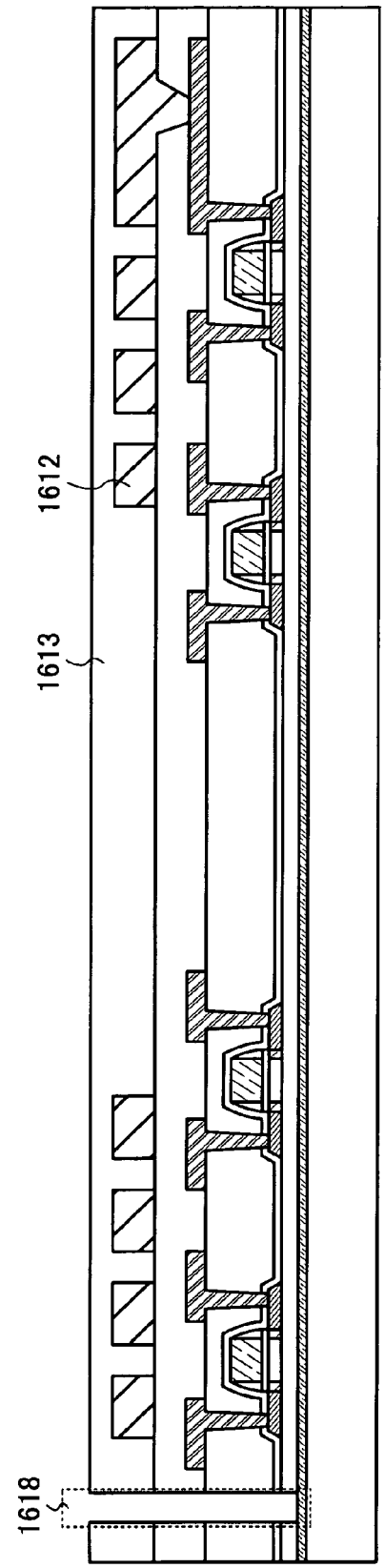

First, an opening 1618 is formed by laser beam irradiation (FIG. 17B). After that, one surface (here, a surface of the insulating film 1617) of the element formation layer is attached to a first sheet material 1620, and then the element formation layer is released from the substrate 1601 by a physical force (FIG. 18A). As the first sheet material 1620, a hot-melt film or the like can be used. In the case of releasing the first sheet material 1620 later, a heat release tape of which adhesion is reduced by being heated can be used.

Note that releasing is performed with a surface to be released getting wet with water or a solution such as ozone water, so that elements such as the thin film transistors 1630a to 1630d can be prevented from being damaged by static electricity or the like. Further, by reusing of the substrate 1601 from which the element formation layer is released, the cost can be reduced.

Next, a second sheet material 1621 is formed on the other surface of the element formation layer (a surface exposed by releasing from the substrate 1601) (FIG. 18B). The second sheet material 1621 can be attached to the other surface of the element formation layer by either one or both a heat treatment and a pressure treatment using a hot-melt film or the like. In the case of using a heat release tape for the first sheet material 1620, peeling can be performed utilizing heat applied at the time of attaching the second sheet material 1621.

Next, the element formation layer provided over the second sheet material 1621 is selectively cut by dicing, scribing, a laser cutting method, or the like and thus, a plurality of semiconductor devices can be obtained. By using a flexible substrate such as a plastic substrate for the second sheet material 1621, a flexible semiconductor device can be formed.

Although this embodiment mode describes the case where an element such as a thin film transistor or an antenna is formed over the substrate 1601 and then released from the substrate 1601 so that a flexible semiconductor device is formed, the present invention is not limited to this. Alternatively, a semiconductor device in which an element such as a thin film transistor or an antenna is formed over the substrate 1601 may be formed by, for example, applying the process in FIGS. 13A to 13D, 16A and 16B, and 17A without providing the release layer 1602 over the substrate 1601.

Note that in this embodiment mode, an example in which an antenna and a semiconductor element are formed over one substrate is described; however, the present invention is not limited thereto. After formation of the semiconductor element, an antenna which is separately formed may be electrically connected to an integrated circuit. In this case, the antenna and the integrated circuit can be electrically connected to each other by being pressure-bonded with an anisotropic conductive film (ACF), anisotropic conductive paste (ACP), or the like. Alternatively, a conductive adhesive such as a silver paste, a copper paste, or a carbon paste; solder joint; or the like may be used for the connection.

Note that this embodiment mode can be implemented in combination with any of technical elements of the other embodiment modes in this specification.

Embodiment Mode 5

In this embodiment mode, a mode is described in which a single crystal semiconductor is used as a semiconductor film over an insulating substrate, which is used for fabrication of a transistor of a semiconductor device, in Embodiment Mode 4.

Hereinafter, this embodiment mode will describe a method for fabricating an insulating substrate on which a single crystal semiconductor is formed (hereinafter referred to as an SOI (silicon on insulator) substrate).

Figure 20A:
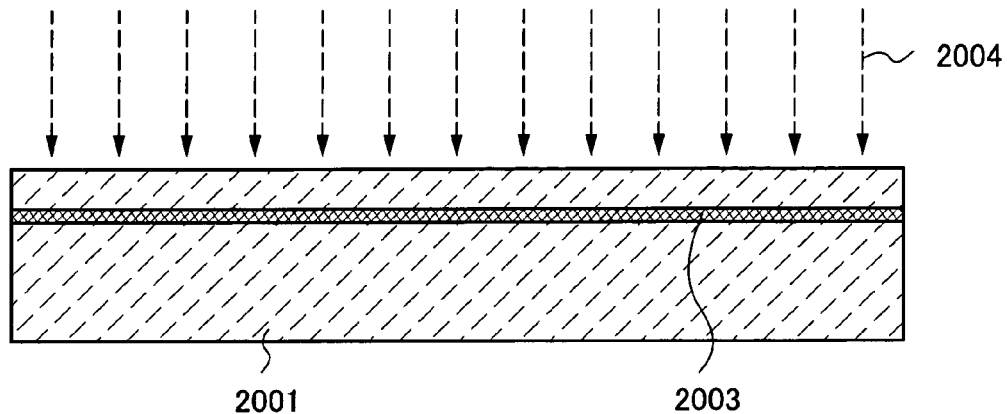
FIGS. 20A to 20C are views showing a method for manufacturing an SOI substrate of Embodiment Mode 5.
Figure 22A:
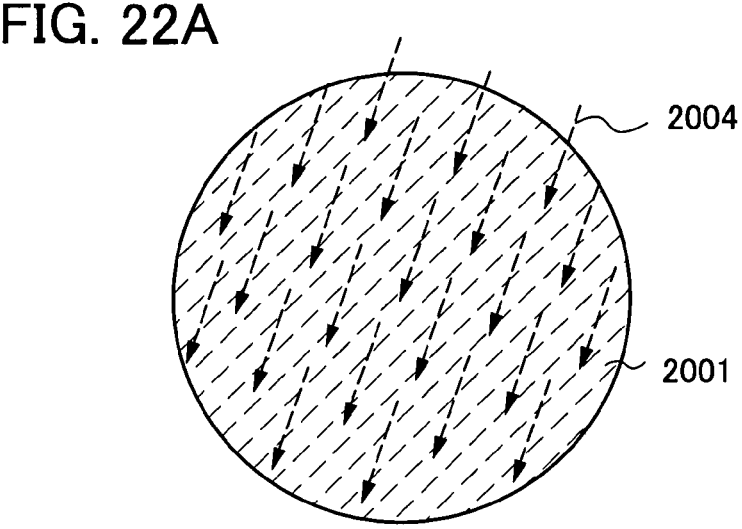
FIGS. 22A to 22C are diagram showing a method for manufacturing an SOI substrate of Embodiment Mode 5.

First, a semiconductor substrate 2001 is prepared (see FIGS. 20A and 22A). As the semiconductor substrate 2001, a commercial semiconductor substrate such as a silicon substrate, a germanium substrate, or a compound semiconductor substrate of a gallium arsenide, indium phosphide, or the like may be used. A size of a commercial silicon substrate is typically five inch (125 mm) in diameter, six inch (150 mm) in diameter, eight inch (200 mm) in diameter, or 12 inch (300 mm) in diameter. The shape of a commercial substrate is a circle in many cases. Further, a thickness of a commercial substrate may be approximately smaller than or equal to 1.5 mm.

Next, ions 2004 accelerated by an electrical field are introduced at a given depth from a surface of the semiconductor substrate 2001 so that an ion-doped layer 2003 is formed (see FIGS. 20A and 22A). The ions 2004 are introduced in view of the thickness of an SOI layer which will be transferred to a base substrate later. A thickness of the SOI layer is preferably from 5 to 500 nm, more preferably, from 10 to 200 nm. The accelerating voltage and the dose of ions at the time of introduction of ions are determined as appropriate in view of the thickness of the SOI substrate to be transferred. As the ions 2004, ions of halogen such as hydrogen, helium, or fluorine can be used. Note that as the ions 2004, ion species of one atom or a plurality of the same atoms generated by exciting a source gas selected from hydrogen, helium, or a halogen element by plasma are preferably used. In the case of introducing hydrogen ions, the hydrogen ions preferably include $H^+$, $H_2^+$, and $H_3^+$ ions with $H_3^+$ions increased in proportion because introduction efficiency of $H_3^+$ ions can be improved and introduction time can be reduced. Further, with such a structure, the SOI layer can be easily separated from the semiconductor substrate.

Note that in order to form the ion-doped layer 2003 at a given depth, there may be a case where the ions 2004 should be introduced at a high dose. At this time, a surface of the semiconductor substrate 2001 may be rough depending on a condition. Therefore, a 50 to 200 nm thick silicon nitride layer or silicon nitride oxide layer may be provided as a protective layer on a surface of the semiconductor substrate, into which ions are introduced.

Figure 20B:
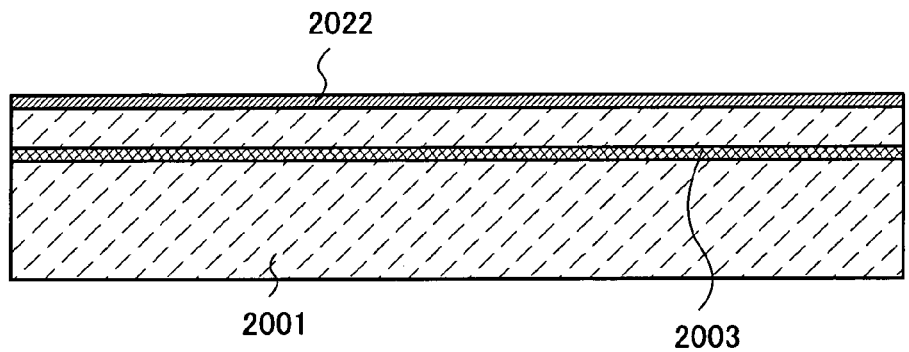
Figure 22B:
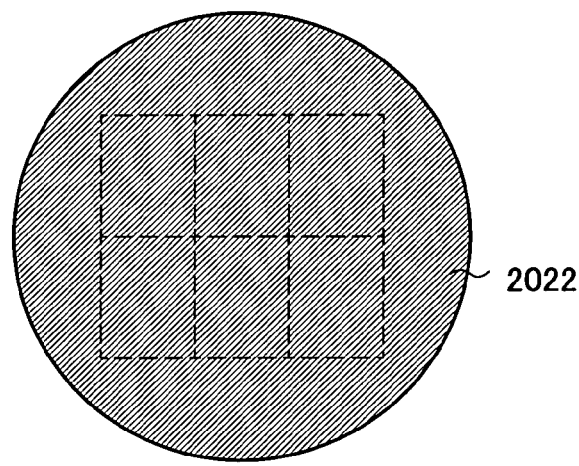

Then, a bonding layer 2022 is formed over the semiconductor substrate 2001 (see FIGS. 20B and 22B). The bonding layer 2022 is formed over a surface of the semiconductor substrate 2001 which is to form a bond with a base substrate. Here, as the bonding layer 2022, a silicon oxide layer formed by a chemical vapor deposition method using an organic silane gas as a material gas as described above is preferably used. Alternatively, a silicon oxide layer formed by a chemical vapor deposition method using a silane gas as a material gas may be used. Film formation by a chemical vapor deposition method is performed at a temperature, for example, 350° C. or lower, at which degassing of the ion-doped layer 2003 that is formed in the semiconductor substrate 2001 does not occur. Note that heat treatment for separating an SOI layer from a semiconductor substrate such as a single crystal semiconductor substrate or a polycrystalline semiconductor substrate is performed at a higher heat treatment temperature than the formation temperature by a chemical vapor deposition method.

Figure 20C:
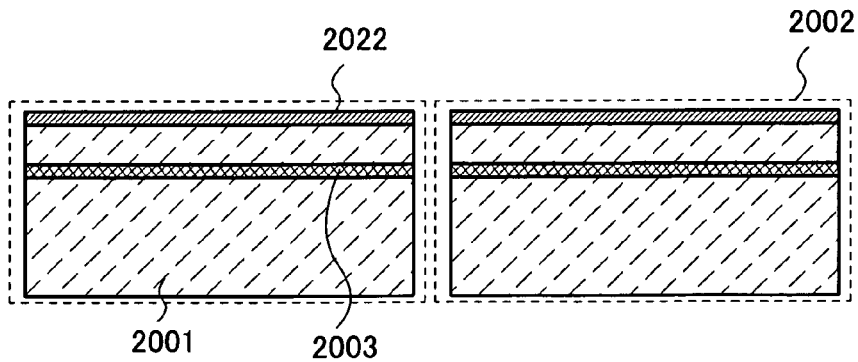
Figure 22C:
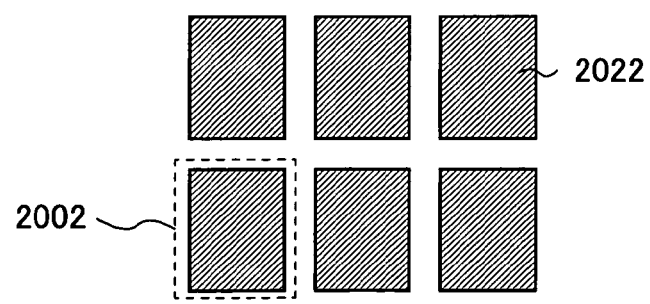

Then, the semiconductor substrate 2001 is processed to have desired size and shape (see FIGS. 20C and 22C). Specifically, the semiconductor substrate 2001 is processed to have a desired size. FIG. 22C shows an example in which the semiconductor substrate 2001 that has a circular shape is cut to obtain rectangular semiconductor substrates 2002. At this time, the bonding layer 2022 and the ion-doped layer 2003 are also cut. That is, the semiconductor substrates 2002 each of which has a desired size, in each of which the ion-doped layer 2003 is formed at a given depth, and each of which has a surface (a bonding surface which is to form a bond with a base substrate) is provided with the bonding layer 2022 are obtained.

The semiconductor substrate 2001 is preferably cut in advance to have the size of a desired semiconductor device. The semiconductor substrate 2001 is cut by a cutting device such as a dicer or a wire saw, laser cutting, plasma cutting, electronic beam cutting, or any cutting means.

The order of the steps up to and including formation of the bonding layer over a surface of the semiconductor substrate can be changed as appropriate. FIGS. 20A to 20C and 22A to 22C show an example in which after the ion-doped layer is formed in the semiconductor substrate and the bonding layer is formed over the semiconductor substrate, the semiconductor substrate is processed to have a desired size. It is also allowed that, for example, after the semiconductor substrate is processed to have a desired size, the ion-doped layer is formed in the semiconductor substrate which has a desired size and the bonding layer is formed over the semiconductor substrate which has a desired size.

Figure 21A:
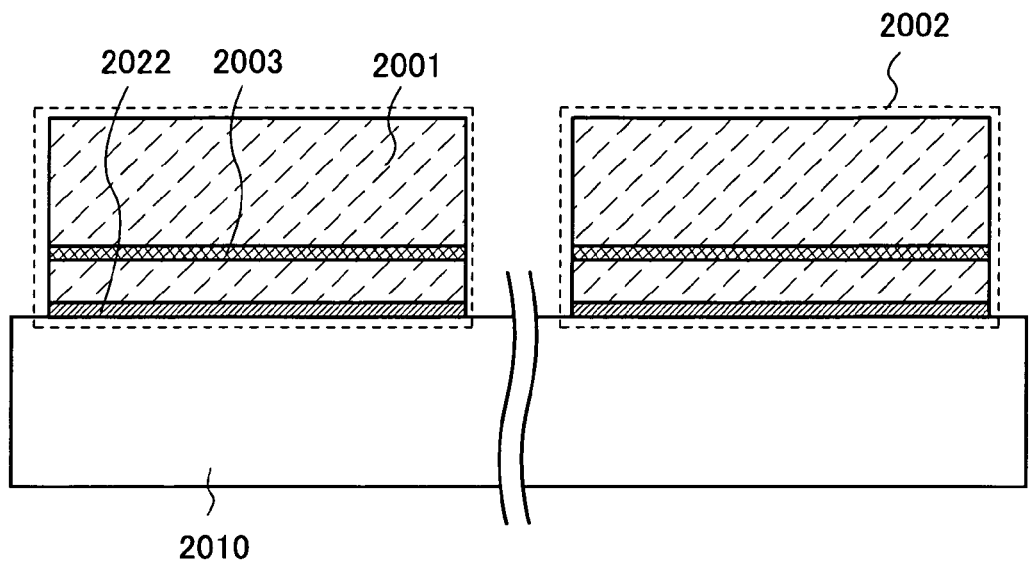
FIGS. 21A and 21B are views showing a method for manufacturing an SOI substrate of Embodiment Mode 5.

Then, the base substrate 2010 and the semiconductor substrate 2002 are attached to each other. FIG. 21A shows an example in which the base substrate 2010 is placed close to the surface of the semiconductor substrate 2002, over which the bonding layer 2022 is formed, to bond the base substrate 2010 and the bonding layer 2022 to each other, so that the base substrate 2010 and the semiconductor substrate 2002 are attached to each other. Note that a surface which is to form a bond (bonding surface) is preferably cleaned sufficiently. By placing the base substrate 2010 in close contact with the bonding layer 2022, a bond is formed therebetween by Van der Waals forces. By pressing the base substrate 2010 and the semiconductor substrate 2002 against each other, a strong bond can be formed by hydrogen bonding.

In order to form a favorable bond between the base substrate 2010 and the bonding layer 2022, the bonding surface may be activated. For example, one or both of the surfaces which are to form a bond are irradiated with an atomic beam or an ion beam. When an atomic beam or an ion beam is used, an inert gas neutral atom beam or inert gas ion beam of argon or the like can be used. Alternatively, plasma irradiation or radical treatment is performed. Such a surface treatment facilitates formation of a bond between different kinds of materials even at a temperature of 400° C. or lower.

After the base substrate 2010 and the semiconductor substrate 2002 are attached to each other with the bonding layer 2022 interposed therebetween, it is preferable that heat treatment or pressure treatment be performed. Heat treatment or pressure treatment makes it possible to increase bonding strength. The heat treatment is preferably performed at a temperature lower than or equal to the upper temperature limit of the base substrate 2010. The pressure treatment is performed so that pressure is applied perpendicularly to the bonding surface, in view of the pressure resistance of the base substrate 2010 and the semiconductor substrate 2002.

Figure 21B:
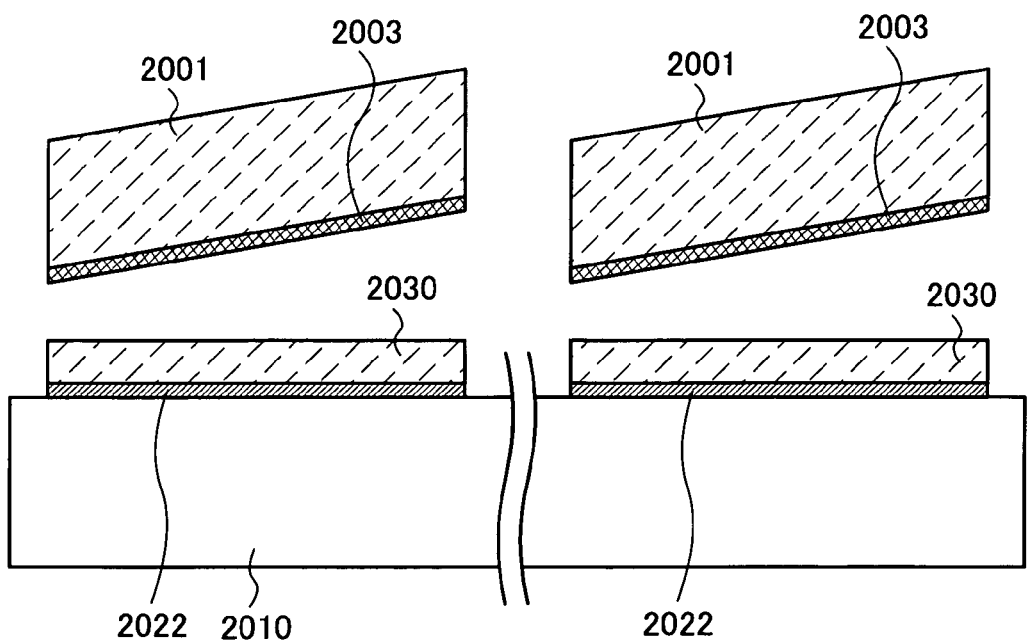

Heat treatment is performed to partially separate the semiconductor substrate 2002 from the base substrate 2010 with the ion-doped layer 2003 used as a cleavage plane (see FIG. 21B). The heat treatment is preferably performed at a temperature ranging from the temperature at which the bonding layer 2022 is formed to the upper temperature limit of the base substrate 2010. When the heat treatment is performed at, for example, 400° C. to 600° C., a change occurs in the volume of fine voids formed in the ion-doped layer 2003, which enables separation to occur along the ion-doped layer 2003. Because the bonding layer 2022 is bonded to the base substrate 2010, an SOI layer 2030 having the same crystallinity as the semiconductor substrate 2002 is left remaining over the base substrate 2010.

Thus, an SOI structure is formed in which the SOI layer 2030 is provided over the base substrate 2010 with the bonding layer 2022 interposed therebetween. Note that the SOI substrate has a structure in which a plurality of SOI layers are provided over one base substrate with the bonding layer interposed therebetween.

Note that chemical mechanical polishing (CMP) is preferably performed to planarize a surface of the SOI layer obtained by separation. Alternatively, a surface of the SOI layer is irradiated with a laser beam for planarization without using a physical polishing means such as CMP. Note that irradiation with a laser beam is preferably performed in a nitrogen atmosphere in which oxygen concentration is lower than or equal to 10 ppm. This is because a surface of the SOI layer could possibly be rough if laser beam irradiation is performed in an oxygen atmosphere. Further, CMP or the like may be performed for thinning the obtained SOI layer.

By the method for fabricating an SOI substrate, which is described in this embodiment mode, the SOI layer 2030 of which a bonding portion has a high bonding strength can be obtained even in the case where the base substrate 2010 is a glass substrate or the like of which an upper temperature limit is lower than or equal to 600° C. Further, since the process may be performed at 600° C. or lower, any of a variety of glass substrates that are used in the electronics industry, called an alkali-free glass substrate, such as aluminosilicate glass substrates, aluminoborosilicate glass substrates, and barium borosilicate glass substrates, can be used as the base substrate 2010. It is needless to say that a ceramics substrate, a sapphire substrate, a quartz substrate, or the like may be used.

In the case of the SOI substrate described in this embodiment mode, a single crystal semiconductor film can be formed directly on an insulating substrate such as a glass substrate; therefore, a crystallization process such as laser crystallization of a semiconductor film for the purpose of improving semiconductor characteristics is not necessary. Thus, because an SOI substrate is fabricated and a transistor and the like are fabricated using the method described in Embodiment Mode 4 so that a semiconductor device can be formed using an element which has a small variation in transistor characteristics, the semiconductor device can be formed to be highly reliable.

Note that this embodiment mode can be implemented in combination with any of technical elements of the other embodiment modes in this specification.

Embodiment Mode 6

Figure 14A:
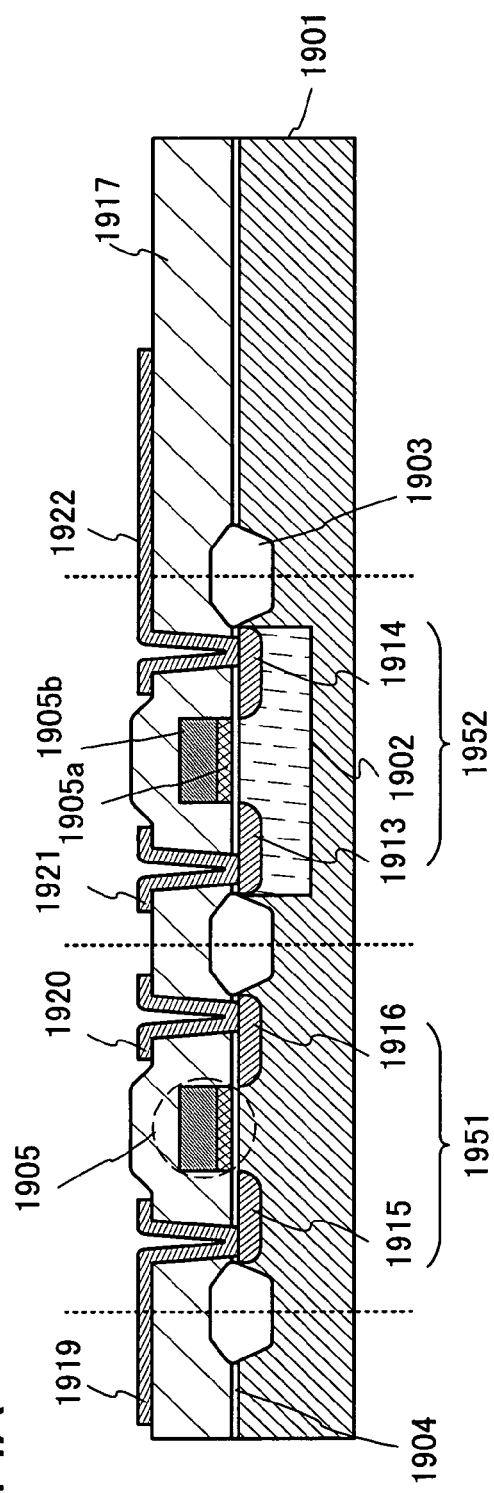
FIGS. 14A and 14B are views showing a method for manufacturing a semiconductor device of Embodiment Mode 6.
Figure 14B:
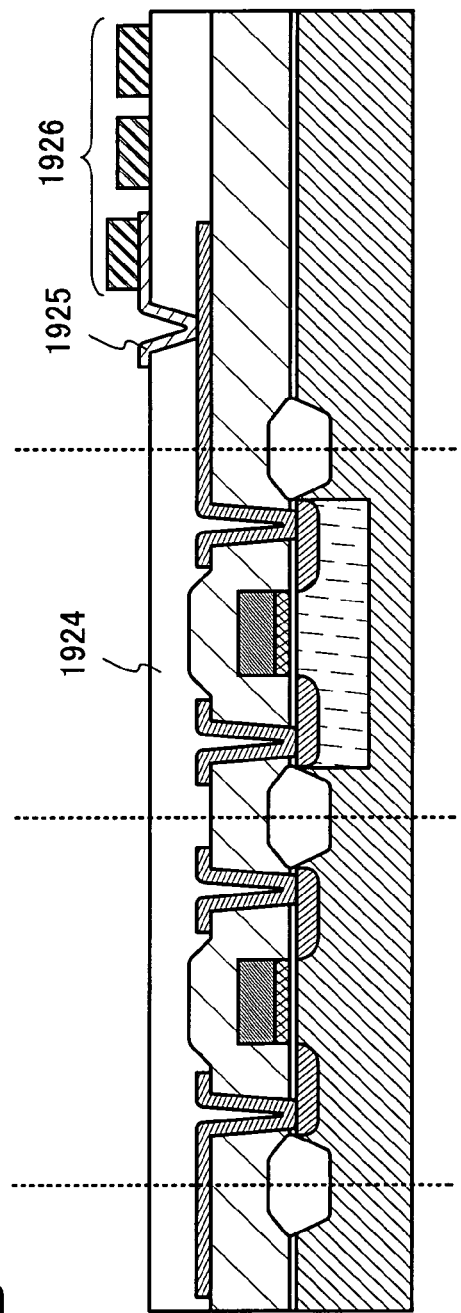
Figure 19:
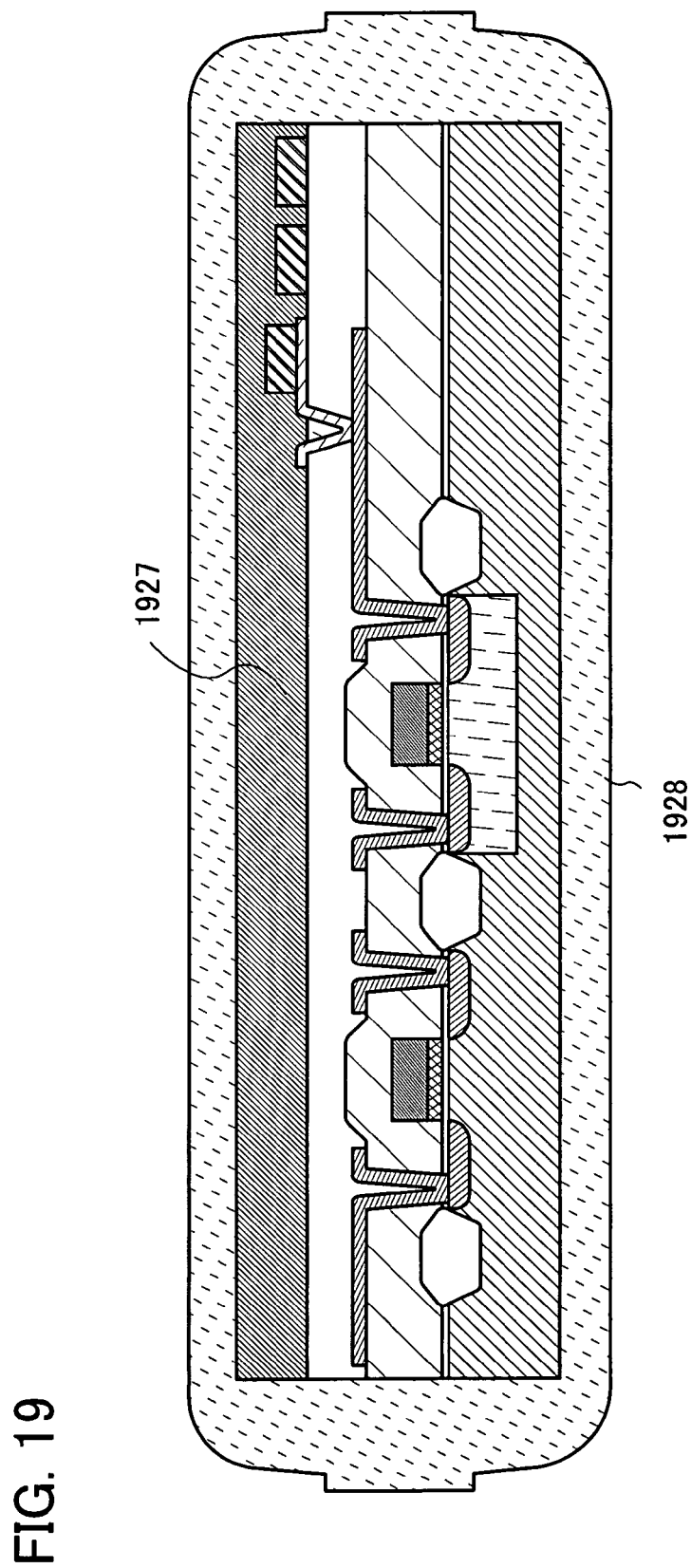
FIG. 19 is a diagram showing a method for manufacturing a semiconductor device of Embodiment Mode 6.

This embodiment mode will describe a mode of forming a semiconductor device by using a single crystal silicon with reference to FIGS. 14A and 14B and 19.

First, a fabrication process of a transistor is described with reference to FIG. 14A. A silicon substrate 1901 made of single-crystal silicon is prepared. Then, a p-well 1902 is selectively formed in an element formation region in a main surface (an element formation surface or a circuit formation surface) of the n-type silicon substrate 1901. Further, the silicon substrate 1901 can be made thinner by, for example, polishing the back surface thereof. By making the silicon substrate 1901 thinner in advance, a lightweight and thin semiconductor device can be formed.

Next, a field oxide film 1903 to be an element isolation region for partitioning the first element formation region and the second element formation region is formed. The field oxide film 1903 is a thick thermal oxide film and may be formed by a known LOCOS (local oxidation of silicon) method. Note that the method for partitioning the element formation regions is not limited to the LOCOS method. For example, by using a trench isolation method, the element isolation region may be formed to have a trench structure, or a combination of a LOCOS structure and a trench structure.

Next, a gate insulating film 1904 is formed by, for example, thermally oxidizing the surface of the silicon substrate. The gate insulating film 1904 may be formed by a CVD method; and a silicon oxynitride film, a silicon oxide film, a silicon nitride film, or a stack thereof can be used.

Next, a layered film of a polysilicon layer 1905a and a silicide layer 1905b is formed over the entire surface. By forming the layered film by lithography and dry etching, gate electrodes 1905 each having a polycide structure are formed over the gate insulating film. In order to reduce resistance, the polysilicon layers 1905a may be doped with phosphorus (P) at a concentration of approximately $10^{21}/cm^3$ in advance, or alternatively, an n-type impurity may be diffused into the polysilicon layers 1905a at a high concentration after forming the polysilicon layers 1905a. Further, the silicide layers 1905b can be formed of a material such as molybdenum silicide ($MoSi_x$), tungsten silicide ($WSi_x$), tantalum siliside ($TaSi_x$), or titanium silicide ($TiSi_x$) in accordance with a known method.

Note that sidewalls are formed on the side walls of the gate electrodes. For example, an insulating material layer formed of silicon oxide may be deposited on the entire surface by a CVD method, and the insulating material layer may be etched back to form the sidewalls. At the etch back, the gate insulating film may be selectively removed in a self-aligned manner.

Next, the exposed silicon substrate is subjected to ion implantation, to form a source region and a drain region. The first element formation region for forming a p-channel FET is coated with a resist material, and arsenic (As) or phosphorus (P), which is an n-type impurity, is implanted into the silicon substrate to form a source region 1913 and a drain region 1914. In addition, the second element formation region for forming an n-channel FET is coated with a resist material, and boron (B), which is a p-type impurity, is implanted into the silicon substrate to form a source region 1915 and a drain region 1916.

Next, an activation treatment is performed in order to activate the ion-implanted impurities and to recover crystal defects in the silicon substrate, which are caused by the ion implantation.

After the activation, an interlayer insulating film, a metal wiring which functions as a source electrode or a drain electrode, and the like are formed. An interlayer insulating film 1917 is formed of a silicon oxide film, a silicon oxynitride film, or the like by a plasma CVD method or a low-pressure CVD method. Note that an interlayer insulating film of phosphosilicate glass (PSG), borosilicate glass (BSG), or phosphoborosilicate glass (PBSG) may be further formed thereover.

Metal electrodes 1919, 1921, 1920, and 1922 are formed after contact holes reaching the source regions and the drain regions of the respective FETs in the interlayer insulating film 1917 and the gate insulating film 1904 are formed. Aluminum (Al), which is commonly used as a low resistance material, may be used for the metal electrodes 1919, 1921, 1920, and 1922. Alternatively, a layered structure of Al and titanium (Ti) may be employed.

Note that the contact holes may be formed by electron beam direct writing lithography. In electron beam direct writing lithography, positive resist for electron beam lithography is formed on the entire surface of the interlayer insulating film 1917, and a portion irradiated with an electron beam is dissolved using a developing solution. Then, holes are opened in the resist of a position where the contact holes are to be formed, and dry etching is performed using the resist as a mask, so that predetermined positions in the interlayer insulating film 1917 and the gate insulating film 1904 can be etched to form the contact holes. Thus, a p-channel transistor 1951 and an n-channel transistor 1952 can be fabricated using a single crystal substrate (FIG. 14A).

Next, as shown in FIG. 14B, an interlayer film 1924 is formed. Then, the interlayer film 1924 is etched to form a contact hole so that the metal electrode 1922 is partially exposed. The interlayer film 1924 is not limited to a resin and may be any other film such as a CVD oxidation film; however, the interlayer film 1924 is desirably a resin in terms of planarity. Alternatively, a contact hole may be formed using a photosensitive resin without the etching. After that, a wiring 1925 in contact with the conductive film 1922 through the contact hole is formed over the interlayer film 1924.

Next, a conductive film 1926 functioning as an antenna is formed so as to contact with the wiring 1925. The conductive film 1926 can be formed using a metal such as silver (Ag), gold (Au), copper (Cu), palladium (Pd), chromium (Cr), platinum (Pt), molybdenum (Mo), titanium (Ti), tantalum (Ta), tungsten (W), aluminum (Al), iron (Fe), cobalt (Co), Zinc (Zn), Tin (Sn), or nickel (Ni). Alternatively, as the conductive film 1926, a film formed of an alloy containing any of the above metals as its main component or a film formed of a compound containing any of the above metals may be used. The conductive film 1926 can be formed to have a single-layer structure or layered structure of the above films.

The conductive films 1926 can be formed by a CVD method, a sputtering method, a printing method such as screen printing or gravure printing, a droplet discharging method, a dispenser method, a plating method, a photolithography method, an evaporation method, or the like.

Note that in this embodiment mode, an example in which an antenna and a semiconductor element are formed over one substrate is described; however, the present invention is not limited thereto. After formation of the semiconductor element, an antenna which is separately formed may be electrically connected to an integrated circuit. In this case, the antenna and the integrated circuit can be electrically connected to each other by being pressure-bonded with an anisotropic conductive film (ACF), anisotropic conductive paste (ACP), or the like. Alternatively, a conductive adhesive such as a silver paste, a copper paste, or a carbon paste; solder joint; or the like may be used for the connection.

Next, as shown in FIG. 19, a protective film 1927 is formed so as to cover the conductive film 1926 which functions as an antenna. The protective film 1927 is formed of a silicon nitride film, a silicon oxide film, or a silicon nitride oxide film. Further, an organic resin film may be formed instead of the silicon nitride film or the like, or an organic resin film may be stacked over the protective film. As an organic resin material, polyimide, polyamide, acrylic, benzocyclobutene (BCB), or the like can be used. It is advantageous to use an organic resin film in that, for example, the method for forming the film is simple, parasitic capacitance can be reduced because of the low dielectric constant, and it is suitable for planarization. It is needless to say that an organic resin film other than the ones described above may be used alternatively.

Then, as shown in FIG. 19, a semiconductor device can be completed by being covered with films 1928. A protective film may be provided on a surface of the film 1928 to prevent penetration of moisture, oxygen, or the like. The protective film can be formed of oxide containing silicon or nitride containing silicon. Further, a pattern which is to be a booster antenna of the semiconductor device may be formed on the film.

A product which is reduced in size and weight can be provided by using such a semiconductor device formed over a single crystal substrate. Further, a semiconductor device which is reduced in size can be made by using such a semiconductor device, and a variation in transistor characteristics is small, which is preferable.

Note that this embodiment mode can be implemented in combination with any of technical elements of the other embodiment modes in this specification.

Embodiment Mode 7

In this embodiment mode, a specific example of an antenna included in a semiconductor device, which is described in any of the above embodiment modes, will be described. An antenna may have a size and a shape suitable for the application in the range determined by the Radio Law. A signal to be transmitted and received has a frequency of 125 kHz, 13.56 MHz, 915 MHz, 2.45 GHz, or the like, which is standardized by the ISO standard or the like. Specifically, a dipole antenna, a patch antenna, a loop antenna, a Yagi antenna, or the like may be used as the antenna. This embodiment mode will describe a shape of an antenna connected to a semiconductor device.

Figure 15A:
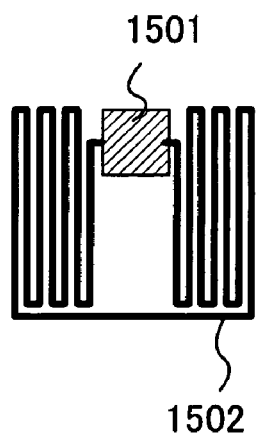
FIGS. 15A to 15D are diagrams each showing the shape of an antenna of Embodiment Mode 7.

FIG. 15A shows an antenna 1502 connected to a semiconductor device 1501. In FIG. 15A, the semiconductor device 1501 is provided in a center portion and the antenna 1502 is connected to a connecting terminal of the semiconductor device 1501. In order to ensure the enough length of the antenna, the antenna 1502 is folded in a rectangular shape.

Figure 15B:
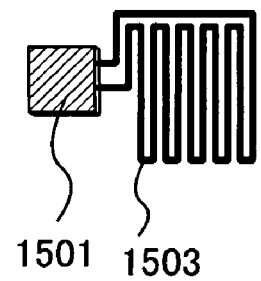

In FIG. 15B, the semiconductor device 1501 is provided on one end side and an antenna 1503 is connected to a connecting terminal of the semiconductor device 1501. In order to ensure the enough length of the antenna, the antenna 1503 is folded in a rectangular shape.

Figure 15C:
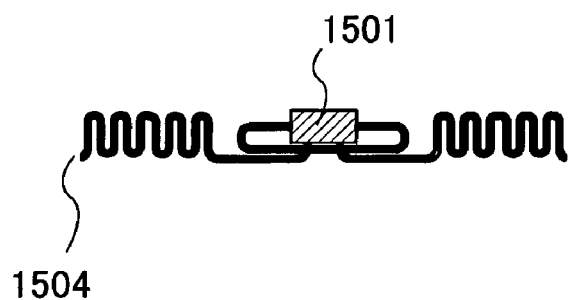

In FIG. 15C, an antenna 1504 which is folded in a meandering shape is connected to both ends of the semiconductor device 1501.

Figure 15D:
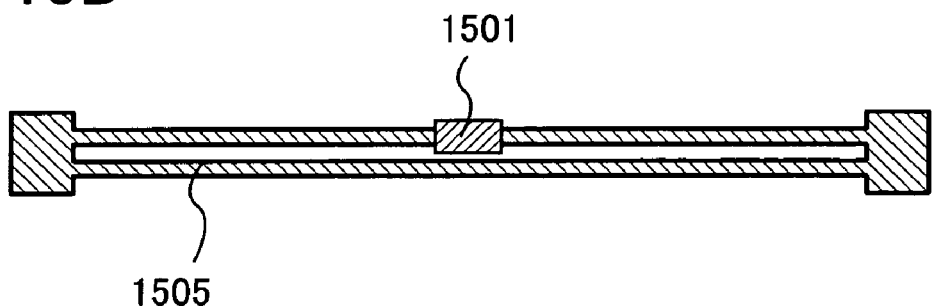

In FIG. 15D, a linear antenna 1505 is connected to both ends of the semiconductor device 1501.

Thus, the shape of an antenna, which is suitable for a structure, a polarized wave, or an application of an semiconductor device, may be selected. Therefore, a folded dipole antenna may be used as the dipole antenna. A circular loop antenna or a square loop antenna may be used as the loop antenna. A circular patch antenna or a square patch antenna may be used as the patch antenna.

In the case of using a patch antenna, an antenna formed of a dielectric material such as ceramic may be used. With a high dielectric constant of a dielectric material to be used as a substrate for the patch antenna, the size of the antenna can be reduced. Moreover, since a patch antenna has high mechanical strength, it can be used repeatedly.

The dielectric material of a patch antenna can be formed of ceramic, an organic resin, a mixture of ceramic and an organic resin, or the like. As a typical example of ceramic, alumina, glass, forsterite, or the like can be given. Alternatively, a mixture of a plurality of ceramics may be used. In order to obtain a high dielectric constant, it is preferable to form a dielectric layer by using a ferroelectric material. A typical example of a ferroelectric material is barium titanate ($BaTiO_3$), lead titanate ($PbTiO_3$), strontium titanate ($SrTiO_3$), lead zirconate ($PbZrO_3$), lithium niobate ($LiNbO_3$), lead zirconate titanate (PZT), or the like. Alternatively, a mixture of a plurality of ferroelectric materials may be used.

Note that this embodiment mode can be implemented in combination with any of technical elements of the other embodiment modes in this specification.

Embodiment Mode 8

Figure 11:
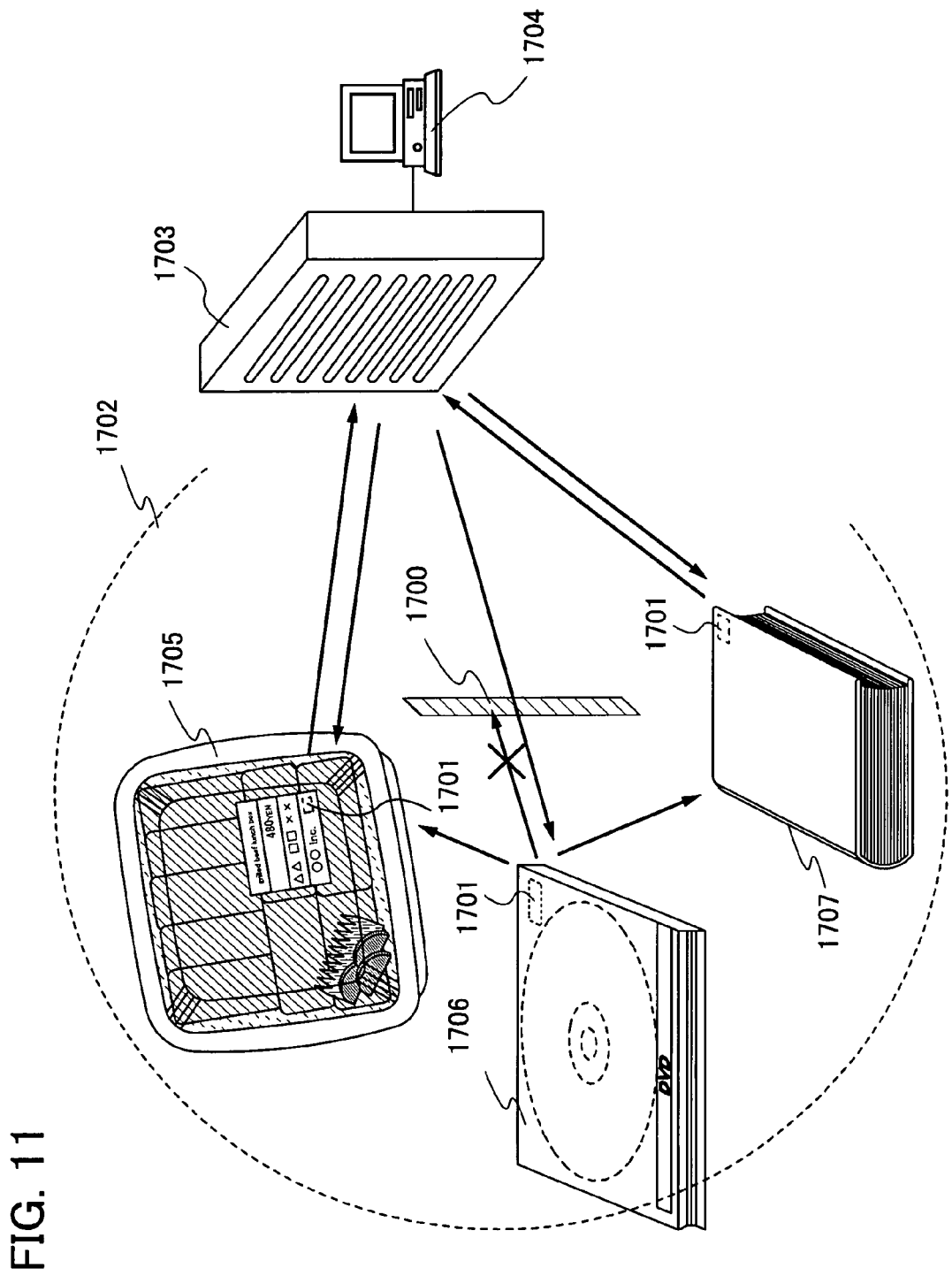
FIG. 11 is a diagram showing an application example of a semiconductor device of Embodiment Mode 8.

This embodiment mode will describe a specific example in which a semiconductor device is used as an RF tag which stores data of an article and the data of the RF tag is transmitted and received to and from a communication device. For example, the RF tag can be mounted on bills, coins, securities, certificates, bearer bonds, packing containers, books, recording media, personal belongings, vehicles, food, clothing, health products, commodities, medicine, electronic devices, and the like. Examples of them are described with reference to FIG. 11. By the wireless communication method described in this embodiment mode, a wireless signal can be transmitted by way of another semiconductor device if it is difficult that the wireless signal is transmitted to the communication device from the RF tag that is a semiconductor device due to an obstacle as described in any of the above embodiment modes. Therefore, as shown in FIG. 11, the data of the RF tag attached to an article which is located behind the obstacle can be read from the communication device. Further, the RF tag that is a semiconductor device can be thinned using a thin film transistor as described in any of the above embodiment modes and thus, the design of an article can be prevented from being spoiled.

FIG. 11 shows a mode of the structure of the wireless communication method of this embodiment mode. An RF tag 1701 shown in FIG. 11 is a non-contact type RF tag which transmits and receives data to and from the communication device 1703 without contact. The RF tag 1701 within an area of radio waves 1702 can receive a first wireless signal from the communication device 1703.

In FIG. 11, a packing container 1705, a storage medium 1706, and a book 1707 present within the area of radio waves 1702 and the communication device 1703 is electrically connected to a computer 1704 and thus managing products, reading data of products, or the like is performed. Note that the packing container 1705 refers to wrapping paper for food containers and the like, a plastic bottle, or the like. The book 1707 refers to a hardback, a paperback, or the like. The storage medium 1706 refers to DVD software, a video tape, or the like. In FIG. 11, the first wireless signal is transmitted from the communication device 1703 to the packing container 1705, the storage medium 1706, and the book 1707 each of which has the RF tag 1701 and presents within the area of radio waves 1702, and data in each RF tag is read. However, the RF tag attached to the storage medium 1706 could possibly have a difficulty in transmission of the second wireless signal to the communication device 1703 due to an obstacle 1700. Even in such a case, by the wireless communication method described in any of the above embodiment modes, the communication device 1703 can recognize the RF tag 1701 attached to the storage medium 1706 which is located behind the obstacle 1700 by way of the RF tag 1701 attached to any other product, here, the packing container 1705 or the book 1707.

By mounting the RF tag 1701 on each of the packing container 1705, the storage medium 1706, the book 1707, and the like and using the wireless communication method described in any of the above embodiment modes, inspection of individual information of the RF tag located at a position where there is an obstacle which could possibly block a wireless signal in an inspection system, a system used in a rental shop, or the like can be prevented from being omitted. The RF tag 1701 can be mounted on the foregoing article by being attached to the surface or being embedded therein. For example, in a case of a book, the RF tag 1701 may be embedded in a piece of paper; in the case of a package made from an organic resin, the RF tag 1701 may be embedded in the organic resin. As described above, the efficiency of an inspection system, a system used in a rental shop, or the like can be improved by mounting the RF tag 1701 on each of the packing container 1705, the storage medium 1706, the book 1707, and the like.

As described above, a semiconductor device used in the wireless communication method described in this embodiment mode may be used by being attached to anything as long as it is an article. A semiconductor device can be used for bills, coins, securities, certificates, bearer bonds, personal belongings, vehicles, food, clothing, health products, commodities, medicine, electronic devices, and the like. This embodiment mode can be implemented in free combination with any of the above-described embodiment modes.

Note that this embodiment mode can be implemented in combination with any of technical elements of the other embodiment modes in this specification.

This application is based on Japanese Patent Application serial no. 2007-109533 filed with Japan Patent Office on Apr. 18, 2007, the entire contents of which are hereby incorporated by reference.

What is claimed is:

1. A wireless communication method in which a first wireless signal transmitted from a communication device is received by a plurality of semiconductor devices including at least a first semiconductor device and a second semiconductor device and thus a second wireless signal is transmitted to the communication device from the plurality of semiconductor devices, comprising:

selectively switching a first state and a second state in the plurality of semiconductor devices including the first semiconductor device and the second semiconductor device in response to the first wireless signal transmitted from the communication device; and transmitting the second wireless signal including detection data indicating that the second wireless signal is received from the first semiconductor device in the first state to the communication device from the second semiconductor device in the second state, wherein the first state is a state in which the first wireless signal transmitted from the communication device is received, wherein the second state is a state in which the second wireless signal transmitted from the plurality of semiconductor devices is received, and wherein the communication device outputs a first instruction for transmitting data stored in the plurality of semiconductor devices to the communication device and a second instruction for selectively switching between the first state and the second state of the plurality of semiconductor devices.

2. The wireless communication method according to claim 1, wherein power for transmitting the second wireless signal including detection data to the communication device is obtained by receiving the first wireless signal from the communication device.

3. The wireless communication method according to claim 1, wherein each of the plurality of semiconductor devices which are attached to an article transmits and receives a wireless signal to and from the communication device.

4. The wireless communication method according to claim 1, wherein each of the plurality of semiconductor devices is formed of a thin film transistor and attached to an article.

5. The wireless communication method according to claim 1, wherein the communication device is connected to an external power source.

6. A wireless communication method in which a first wireless signal transmitted from a communication device is received by a plurality of semiconductor devices including at least a first semiconductor device and a second semiconductor device and thus a second wireless signal is transmitted to the communication device from the plurality of semiconductor devices, comprising:

selectively switching a first state and a second state in the plurality of semiconductor devices including the first semiconductor device and the second semiconductor device in response to the first wireless signal transmitted from the communication device;

storing data of the second wireless signal from the first semiconductor device in the first state in a storage element included in the second semiconductor device in the second state; and transmitting data stored in the storage element as the second wireless signal to the communication device when the second semiconductor device receives the first wireless signal from the communication device, wherein the first state is a state in which the first wireless signal transmitted from the communication device is received, wherein the second state is a state in which the second wireless signal transmitted from the plurality of semiconductor devices is received, and wherein the communication device outputs a first instruction for transmitting data stored in the plurality of semiconductor devices to the communication device, a second instruction for selectively switching between the first state and the second state of the plurality of semiconductor devices, and a third instruction for reading data from any one of the plurality of semiconductor devices, which stores data in the storage element.

7. The wireless communication method according to claim 6, wherein each of the plurality of semiconductor devices which are attached to an article transmits and receives a wireless signal to and from the communication device.

8. The wireless communication method according to claim 6, wherein each of the plurality of semiconductor devices is formed of a thin film transistor and attached to an article.

9. The wireless communication method according to claim 6, wherein the communication device is connected to an external power source.

10. A wireless communication method comprising:

selectively switching a state in a second semiconductor device from a first state to a second state in response to a first wireless signal transmitted from a communication device; and transmitting a second wireless signal including detection data indicating that the second wireless signal is received from a first semiconductor device in the first state to the communication device from the second semiconductor device in the second state, wherein the first state is a state in which the first wireless signal transmitted from the communication device is received, wherein the second state is a state in which the second wireless signal transmitted from the first semiconductor device or the second semiconductor device is received, and wherein the communication device outputs a first instruction for transmitting data stored in the first semiconductor device and the second semiconductor device to the communication device and a second instruction for selectively switching between the first state and the second state of the second semiconductor device.

11. The wireless communication method according to claim 10, wherein power for transmitting the second wireless signal including detection data to the communication device is obtained by receiving the first wireless signal from the communication device.

12. The wireless communication method according to claim 10, wherein the first semiconductor device and the second semiconductor device transmit and receive a wireless signal to and from the communication device.

13. The wireless communication method according to claim 10, wherein the first semiconductor device and the second semiconductor device are formed of a thin film transistor.

14. The wireless communication method according to claim 10, wherein the communication device is connected to an external power source.

15. A wireless communication method comprising:

selectively switching a state in a second semiconductor device from a first state to a second state in response to a first wireless signal transmitted from a communication device;

storing data of a second wireless signal from a first semiconductor device in the first state in a storage element included in the second semiconductor device in the second state; and transmitting data stored in the storage element as the second wireless signal to the communication device, wherein the first state is a state in which the first wireless signal transmitted from the communication device is received, wherein the second state is a state in which the second wireless signal transmitted from the first semiconductor device or the second semiconductor device is received, and wherein the communication device outputs a first instruction for transmitting data stored in the first semiconductor device and the second semiconductor device to the communication device, a second instruction for selectively switching between the first state and the second state of the second semiconductor device, and a third instruction for reading data from the second semiconductor device, which stores data in the storage element.

16. The wireless communication method according to claim 15, wherein the first semiconductor device and the second semiconductor device transmit and receive a wireless signal to and from the communication device.

17. The wireless communication method according to claim 15, wherein the first semiconductor device and the second semiconductor device are formed of a thin film transistor.

18. The wireless communication method according to claim 15, wherein the communication device is connected to an external power source.

* * * * *